United States Patent
Jain et al.

(10) Patent No.: US 10,027,763 B2
(45) Date of Patent: Jul. 17, 2018

(54) ABORT MESSAGES FOR POSITION LOCATION MESSAGE FLOWS

(71) Applicant: QUALCOMM Incorporated, San Diego, CA (US)

(72) Inventors: Amit Jain, San Diego, CA (US); Govind Ram Venkat Narayan, San Diego, CA (US); Srigouri Kamarsu, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 267 days.

(21) Appl. No.: 15/081,699

(22) Filed: Mar. 25, 2016

(65) Prior Publication Data

US 2017/0279899 A1    Sep. 28, 2017

(51) Int. Cl.
*H04L 29/08*    (2006.01)
*H04W 4/02*    (2018.01)

(52) U.S. Cl.
CPC .......... *H04L 67/142* (2013.01); *H04W 4/025* (2013.01)

(58) Field of Classification Search
CPC .................. H04W 4/025; H04L 67/142
See application file for complete search history.

(56) References Cited

U.S. PATENT DOCUMENTS

| | | |
|---|---|---|
| 8,675,474 B2 | 3/2014 | Chien et al. |
| 8,699,460 B2 | 4/2014 | Wachter |
| 8,983,499 B2 | 3/2015 | Blumstein et al. |
| 8,995,393 B2 | 3/2015 | Siomina et al. |
| 9,094,810 B2 | 7/2015 | Edge |
| 2012/0196615 A1* | 8/2012 | Edge ............ G01S 5/0036 455/456.1 |
| 2014/0295884 A1 | 10/2014 | Racz et al. |
| 2015/0141049 A1 | 5/2015 | Jiang et al. |

FOREIGN PATENT DOCUMENTS

WO    WO-2011127419 A2    10/2011

OTHER PUBLICATIONS

International Search Report and Written Opinion—PCT/US2017/019215—ISA/EPO—dated Jun. 7, 2017.
3GPP TS 29.171, "3rd Generation Partnership Project; Technical Specification Group Core Network and Terminals; Location Services (LCS); LCS Application Protocol (LCS-AP) between the Mobile Management Entity (MME) and Evolved Serving Mobile Location Centre (E-SMLC); SLs interface (Release 13)", 3GPP TS 29.171 V13.0.0, Sep. 2015, 51 pages.
3GPP TS 36.355, "3rd Generation Partnership Project; Technical Specification Group Radio Access Network; Evolved Universal Terrestrial Radio Access (E-UTRA); LTE Positioning Protocol (LPP) (Release 12)", 3GPP TS 36.355 V12.4.0, Mar. 2015, 126 pages.

* cited by examiner

*Primary Examiner* — Kim T Nguyen
(74) *Attorney, Agent, or Firm* — Berkeley Law & Technology Group, LLP

(57) ABSTRACT

Provided is an enhanced LPP transport that may improve performance where a sender or receiver of messages processes certain messages that include requests to abort transactions or sessions, or processes certain messages that might otherwise result in the sending of abort messages. Embodiments may reduce unwanted system actions such as, for example, the unwanted termination of a transaction or session, or the unnecessary use of system resources.

28 Claims, 11 Drawing Sheets

700

710

Transmitting to a second endpoint a first message of a first transaction of a first session, wherein the first message includes a request to abort the first transaction, and wherein the first message does not include a request for an acknowledgment message from the second endpoint.

Receiving from a second endpoint a first message, wherein one or more transactions of a first session are ongoing at the time of the receiving of the first message and wherein one or more transactions have one or more transaction identifications, wherein the first message includes a request to abort a transaction, and wherein the first message either includes a transaction identification that is other than any one of the one or more transaction identifications or does not include any transaction identification.

920

After the receiving of the first message, completing the one or more transactions by exchanging with the second endpoint one or more additional messages of the one or more transactions.

FIG. 9

ABORT MESSAGES FOR POSITION LOCATION MESSAGE FLOWS

FIELD

Aspects of the present disclosure relate, in general, to positioning operations for mobile devices and, more particularly, to communications to and from mobile devices for purposes of developing estimates of positions.

INFORMATION

Determining the location of a mobile device, such as a wireless phone, laptop, tablet, identity tag etc., may be useful to assist the user by providing location information, to provide the location to a client application or device for the purpose of supporting a service or function, etc. Examples of such services and functions may include providing navigation instructions to the user of the mobile device, tracking the location of some asset, and enabling the mobile device to obtain its own location.

A number of positioning methods and protocols have been developed to support location estimation for those mobile devices that can access wireless networks. Such networks may include Long Term Evolution (LTE), WLAN, Wideband CDMA (WCDMA), Global System for Mobile Communications (GSM) and Code Division Multiple Access (CDMA), as well as fixed access networks such as packet cable and digital subscriber line (DSL), for example.

These position methods and protocols may rely on communication between a mobile device and a location server supported by one or more intervening fixed and/or wireless networks. One such positioning protocol is known as the LTE Positioning Protocol (LPP). This was developed by the 3rd Generation Partnership Project (3GPP) in 3GPP Technical Specification (TS) 36.355 which is publicly available. This protocol is intended to locate mobile devices that are currently accessing a LTE network. An extension to this protocol, known as LPP Extensions (LPPe), is being developed in order to locate mobile devices that are currently accessing an LTE network or certain other kinds of network such as GSM, WCDMA, WLAN, or fixed access.

The LPP, LPPe, and certain other positioning protocols may support location determination by having the capability to transfer positioning assistance data from a location server to a mobile device that is being located in order to better enable the mobile device to make measurements of suitable signals (e.g., signals from Global Positioning System (GPS) or Global Navigation Satellite System (GNSS) satellites, signals from wireless network base stations, etc.) and, in some cases, to determine its own location from these measurements. The protocols may also have the capability to allow the location server to request and later receive particular signal measurements from the mobile device to enable the location server to calculate the location of the mobile device.

SUMMARY OF CERTAIN EMBODIMENTS

Broadly speaking, certain embodiments relate to an enhanced LPP transport that can improve performance where a sender or receiver of messages processes certain messages that include requests to abort transactions or sessions, or processes certain messages that might otherwise result in the sending of abort messages. Embodiments may reduce unwanted system actions such as, for example, the unwanted termination of a transaction or session, or the unnecessary use of system resources.

In a first embodiment, a method is provided at a first endpoint for exchanging messages. A first message is received from a second endpoint, wherein the first message is of an initial transaction of a second session to initiate the second session while a first session has not completed. The first session had commenced prior to the receipt of the first message. A plurality of additional messages of the second session is exchanged with the second endpoint, without transmitting to the second endpoint an abort message requesting to abort one or more transactions of the first session, Each of the first and second endpoints is capable of operating in compliance with one or more 3rd Generation Partnership Project (3GPP) Long Term Evolution (LTE) standards.

In a second embodiment, a mobile device is provided for communicating with a server. The mobile device comprises a transceiver for wirelessly transmitting messages to and wirelessly receiving messages from a communication network. The mobile device further comprises one or more processors in communication with the transceiver. The one or more processors are configured to obtain from the server a first message of an initial transaction of a second session to initiate the second session while a first session has not completed. The first session had commenced prior to the obtaining of the first message. The one or more processors are further configured to initiate an exchange with the server of a plurality of additional messages of the second session without initiating a transmission to the server of an abort message requesting to abort one or more transactions of the first session. The mobile device and the server are each capable of operating in compliance with one or more 3rd Generation Partnership Project (3GPP) Long Term Evolution (LTE) standards.

In a third embodiment, non-transitory storage medium is for use with a mobile device configured to communicate with a server. The non-transitory storage medium comprises machine-readable instructions stored thereon which are executable by the mobile device to obtain, from the server, a first message of an initial transaction of a second session to initiate the second session while a first session has not completed. The first session had commenced prior to the obtaining of the first message. The machine-readable instructions are further executable by the mobile device to initiate an exchange, with the server, of a plurality of additional messages of the second session without initiating a transmission to the server of an abort message during a time period between the obtaining of the first message of the initial transaction of the second session and a commencement of the exchanging of the plurality of additional messages of the second session, wherein the abort message comprises a request to abort one or more transactions of the first session. The mobile device and the server are each capable of operating in compliance with one or more 3rd Generation Partnership Project (3GPP) Long Term Evolution (LTE) standards.

In a fourth embodiment, a mobile device for communicating with a server comprises means for receiving, from the server, a first message of an initial transaction of a second session to initiate the second session while a first session has not completed. The first session had commenced prior to the receipt of the first message. The mobile device further comprises means for exchanging, with the server, a plurality of additional messages of the second session without transmitting to the server an abort message requesting to abort one or more transactions of the first session. The abort message is not transmitted during a time period between the receipt of the first message of the initial transaction of the second session and a commencement of the exchanging of the plurality of additional messages of the second session. The mobile device and the server are each capable of operating in compliance with one or more 3rd Generation Partnership Project (3GPP) Long Term Evolution (LTE) standards.

There are additional aspects to the present inventions. It should therefore be understood that the preceding is merely a brief summary of some embodiments and aspects of the present inventions. Additional embodiments and aspects are referenced below. It should further be understood that numerous changes to the disclosed embodiments can be made without departing from the spirit or scope of the inventions. The preceding summary therefore is not meant to limit the scope of the inventions. Rather, the scope of the inventions is to be determined by appended claims and their equivalents.

BRIEF DESCRIPTION OF THE DRAWINGS

These and/or other aspects and advantages of the claimed subject matter will become apparent and more readily appreciated from the following description of certain embodiments, taken in conjunction with the accompanying drawings of which:

FIG. 7 is a flow diagram illustrating interactions between endpoints according to another embodiment;

FIG. 9 is a flow diagram illustrating interactions between endpoints according to another embodiment;

DETAILED DESCRIPTION

Figure 1:
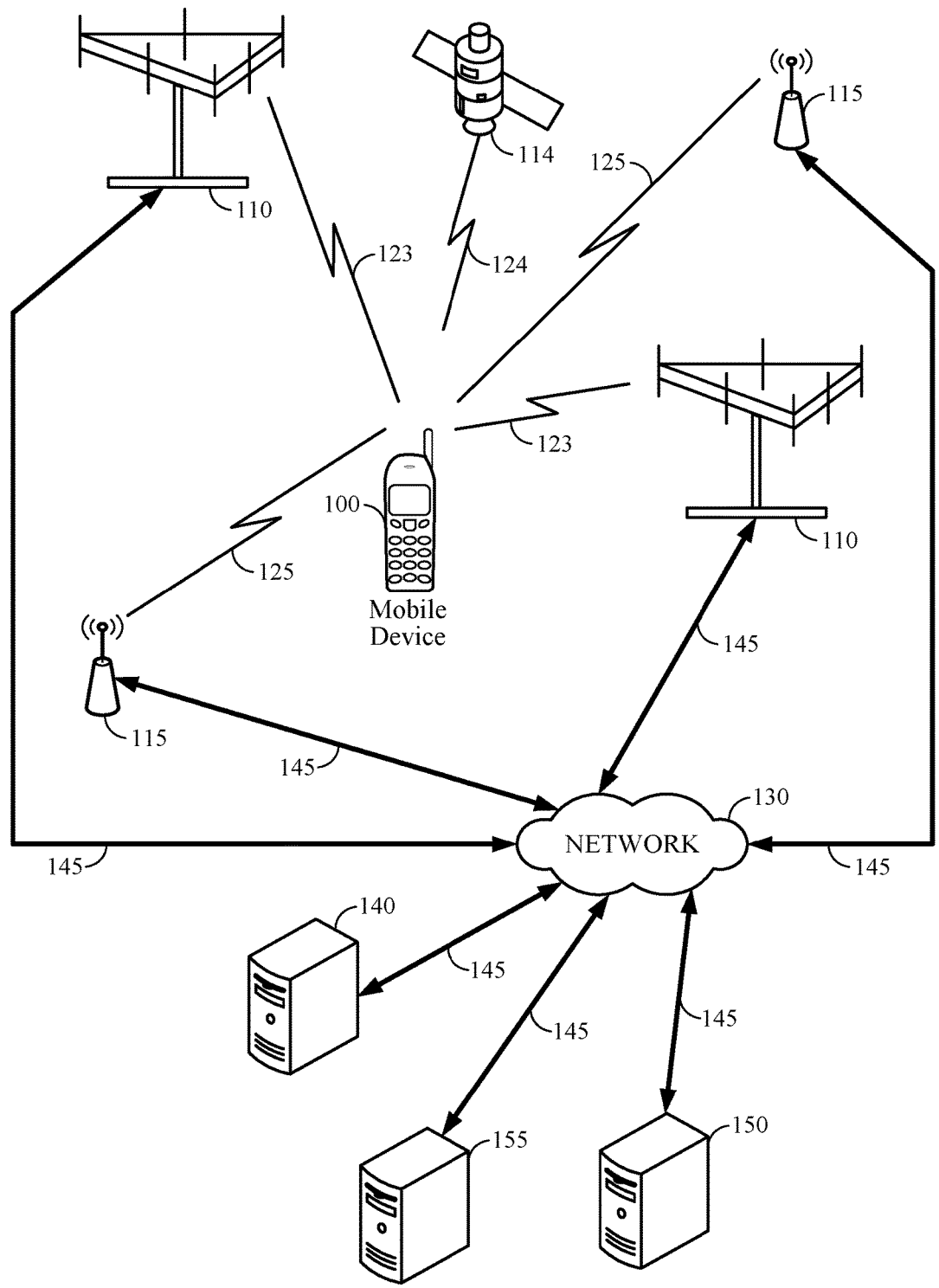
FIG. 1 is a system diagram illustrating certain features of a system containing a mobile device, in accordance with an implementation.

The following description is of the best mode presently contemplated for carrying out claimed subject matter. Moreover in the following description, details are set forth by way of example to enable a person of ordinary skill in the art to practice claimed subject matter without undue experimentation. Reference will be made in detail to embodiments of claimed subject matter, examples of which are illustrated in the accompanying drawings, wherein like reference numerals refer to like elements throughout. It is understood that other embodiments may be used and structural and operational changes may be made without departing from the scope of claimed subject matter.

LPP may be used point-to-point between a target device (e.g., a mobile device or other user equipment (UE), etc.), on the one hand, and a location server, on the other hand, in order to develop an estimate of the location of the target device using position-related measurements obtained by one or more reference sources. A UE may refer to a mobile device, a mobile station, a target, an endpoint, a terminal, an access terminal, a subscriber unit, a station, a cellular phone, a personal digital assistant (PDA), a wireless device, a wireless modem, a wireless router, a laptop computer, a telemetry device, a tracking device, etc.

Embodiments disclosed herein may provide for an enhanced LPP transport that can improve performance where a sender or receiver of messages processes certain messages that include requests to abort transactions or sessions, or processes certain messages that might otherwise result in the sending of abort messages. Embodiments may reduce unwanted system actions such as, for example, the unwanted termination of a transaction or session, or the unnecessary use of system resources.

As shown in FIG. 1 in a particular implementation, a mobile device 100 may transmit radio signals to, and receive radio signals from, a wireless communication network. Mobile device 100 may also be referred to as a UE, a mobile station, a target, an endpoint, a terminal, an access terminal, a subscriber unit, a station, etc. Mobile device 100 may further be a cellular phone, a personal digital assistant (PDA), a wireless device, a wireless modem, a wireless router, a laptop computer, a telemetry device, a tracking device, etc. In one example, mobile device 100 may communicate with a cellular communication network by transmitting wireless signals to, or receiving wireless signals from cellular transceivers 110 which may comprise a wireless base transceiver subsystem (BTS), a Node B or an evolved NodeB (eNodeB) over wireless communication links 123. Similarly, mobile device 100 may transmit wireless signals to, or receive wireless signals from local transceivers 115 over wireless communication links 125.

Local transceivers 115 may comprise an access point (AP), femtocell, Home Base Station, small cell base station, Home Node B (HNB) or Home eNodeB (HeNB) and may provide access to a wireless local area network (WLAN, e.g., IEEE 802.11 network), a wireless personal area network (WPAN, e.g., Bluetooth® network) or a cellular network (e.g., an LTE network or other wireless wide area network such as those discussed elsewhere herein). Of course it should be understood that these are merely examples of networks that may communicate with a mobile device over a wireless link, and claimed subject matter is not limited in this respect.

Examples of network technologies that may support wireless communication links 123 may include Global System for Mobile Communications (GSM), Code Division Multiple Access (CDMA), Wideband CDMA (WCDMA) and High Rate Packet Data (HRPD). GSM, WCDMA and LTE are technologies defined by 3GPP. CDMA and HRPD are technologies defined by the 3rd Generation Partnership Project 2 (3GPP2). WCDMA may also be part of the Universal Mobile Telecommunications System (UMTS) and may be supported by an HNB.

Cellular transceivers 110 may comprise deployments of equipment providing subscriber access to a wireless telecommunication network for a service (e.g., under a service contract). Here, one or more of cellular transceivers 110 may perform functions of a cellular base station in servicing subscriber devices within a cell determined based, at least in part, on a range at which the cellular transceivers 110 are capable of providing access service. Examples of radio technologies that may support wireless communication links 125 are IEEE 802.11, Bluetooth (BT) and LTE.

In a particular implementation, cellular transceivers 110 and local transceivers 115 may communicate with servers 140, 150 and/or 155 over a network 130 through links 145. Here, network 130 may comprise any combination of wired or wireless links and may include cellular transceivers 110 and/or local transceivers 115 and/or servers 140, 150 and 155. In a particular implementation, network 130 may comprise Internet Protocol (IP) or other infrastructure capable of facilitating communication between mobile device 100 and servers 140, 150 or 155 through local transceivers 115 or cellular transceivers 110. In some implementations one or more of servers 140, 150, 155 may comprise endpoints.

In an embodiment, network 130 may also facilitate communication between mobile device 100 and servers 140, 150 and/or 155. In another implementation, network 130 may comprise cellular communication network infrastructure such as, for example, a base station controller or packet based or circuit based switching center (not shown) to facilitate mobile cellular communication with mobile device 100. In a particular implementation, network 130 may comprise local area network (LAN) elements such as WLAN APs, routers and bridges and may in that case include or have links to gateway elements that provide access to wide area networks such as the Internet. In other implementations, network 130 may comprise a LAN and may or may not have access to a wide area network but may not provide any such access (if supported) to mobile device 100. In some implementations network 130 may comprise multiple networks (e.g., one or more wireless networks and/or the Internet). In one implementation, network 130 may include one or more serving gateways or Packet Data Network gateways. In addition, one or more of servers 140, 150 and 155 may be an enhanced serving mobile location center (E-SMLC), a Secure User Plane Location (SUPL) Location Platform (SLP), a SUPL Location Center (SLC), a SUPL Positioning Center (SPC), a Position Determining Entity (PDE) and/or a gateway mobile location center (GMLC), each of which may connect to one or more location retrieval functions (LRFs) and/or mobility management entities (MMEs) in network 130.

In particular implementations, and as discussed elsewhere herein, mobile device 100 may have circuitry and processing resources capable of obtaining location related measurements (e.g. for signals received from GPS or other Satellite Positioning System (SPS) satellites (such as SPS satellite 114), cellular transceivers 110 or local transceivers 115 and possibly computing a position fix or estimated location of mobile device 100 based on these location related measurements. In some implementations, location related measurements obtained by mobile device 100 may be transferred to a location server such as an E-SMLC or a SLP (e.g. which may be one of servers 140, 150 and 155) after which the location server may estimate or determine a location for mobile device 100 based on the measurements.

In the presently illustrated example, location related measurements obtained by mobile device 100 may include measurements of signals 124 received from satellites belonging to an SPS or GNSS such as GPS, GLONASS, Galileo or Beidou and/or may include measurements of signals (such as signals 123 and/or signals 125) received from terrestrial transmitters fixed at known locations (e.g., such as cellular transceivers 110). Mobile device 100 or a separate location server may then obtain a location estimate for mobile device 100 based on these location related measurements using any one of several position methods such as, for example, GNSS, Assisted GNSS (A-GNSS), Advanced Forward Link Trilateration (AFLT), Observed Time Difference Of Arrival (OTDOA), Enhanced Cell ID (E-CID), or combinations thereof.

In some of these techniques (e.g. A-GNSS, AFLT and OTDOA), pseudoranges or timing differences may be measured at mobile device 100 relative to three or more terrestrial transmitters fixed at known locations or relative to four or more satellites with accurately known orbital data, or combinations thereof, based at least in part, on pilots, positioning reference signals (PRS) or other positioning related signals transmitted by the transmitters or satellites and received at mobile device 100. Here, servers 140, 150 or 155 may be capable of providing positioning assistance data to mobile device 100 including, for example, information regarding signals to be measured (e.g., signal timing), locations and identities of terrestrial transmitters and/or signal, timing and orbital information for GNSS satellites to facilitate positioning techniques such as A-GNSS, AFLT, OTDOA and E-CID.

For example, servers 140, 150 or 155 may comprise an almanac which indicates locations and identities of cellular transceivers and/or local transceivers in a particular region or regions such as a particular venue, and may provide information descriptive of signals transmitted by a cellular base station or AP such as transmission power and signal timing. In the case of E-CID, a mobile device 100 may obtain measurements of signal strengths for signals received from one or more cellular transceivers 110 and/or local transceivers 115 and/or may obtain a round trip signal propagation time (RTT) between mobile device 100 and one or more cellular transceivers 110 or local transceivers 115. A mobile device 100 may use these measurements together with positioning assistance data (e.g. terrestrial almanac data or GNSS satellite data such as GNSS Almanac and/or GNSS Ephemeris information) received from one or more of server 140, 150 or 155 to determine a location for mobile device 100 or may transfer the measurements to server 140, 150 or 155 to perform the same determination.

A mobile device (e.g. mobile device 100 of FIG. 1) may be referred to as a device, a wireless device, a mobile terminal, a UE, a terminal, a target, a mobile station (MS), a SUPL Enabled Terminal (SET) or by some other name and may correspond to a cellphone, smartphone, laptop, tablet, PDA, tracking device or some other portable or moveable device. Typically, though not necessarily, a mobile device may support wireless communication such as using GSM, WCDMA, LTE, CDMA, HRPD, WLAN, BT, Worldwide Interoperability for Microwave Access (WiMAX), etc. A mobile device may also support wireless communication using a wireless WLAN, DSL or packet cable for example. A mobile device may comprise a single entity or may comprise multiple entities such as in a personal area network where a user may employ audio, video and/or data I/O devices and/or body sensors and a separate wireline or wireless modem.

An estimate of a location of a mobile device (e.g., mobile device 100) may be referred to as a location, location estimate, location fix, fix, position, position estimate or position fix, and may be geographic, thus providing location coordinates for the mobile device (e.g., latitude and longitude) which may or may not include an altitude component (e.g., height above sea level, height above or depth below ground level, floor level or basement level). Alternatively, a location of a mobile device may be expressed as a civic location (e.g., as a postal address or the designation of some point or small area in a building such as a particular room or floor). A location of a mobile device may also be expressed as an area or volume (defined either geographically or in civic form) within which the mobile device is expected to be located with some probability or confidence level (e.g., 67% or 95%). A location of a mobile device may further be a relative location comprising, for example, a distance and direction or relative X, Y (and Z) coordinates defined relative to some origin at a known location which may be defined geographically or in civic terms or by reference to a point, area or volume indicated on a map, floor plan or building plan. In the description contained herein, the use of the term location may comprise any of these variants unless indicated otherwise.

The network architecture described previously in relation to FIG. 1 may be considered as a generic architecture that can fit a variety of outdoor and indoor location solutions including the standard SUPL user plane location solution defined by the Open Mobile Alliance (OMA) and standard control plane location solutions defined by 3GPP and 3GPP2. For example, server 140, 150 or 155 may function as (i) a SUPL SLP to support the SUPL location solution, (ii) an E-SMLC to support the 3GPP control plane location solution with LTE access on wireless communication link 123 or 125, or (iii) a Standalone Serving Mobile Location Center (SAS) to support the 3GPP Control Plane Location solution for UMTS.

Figure 2:
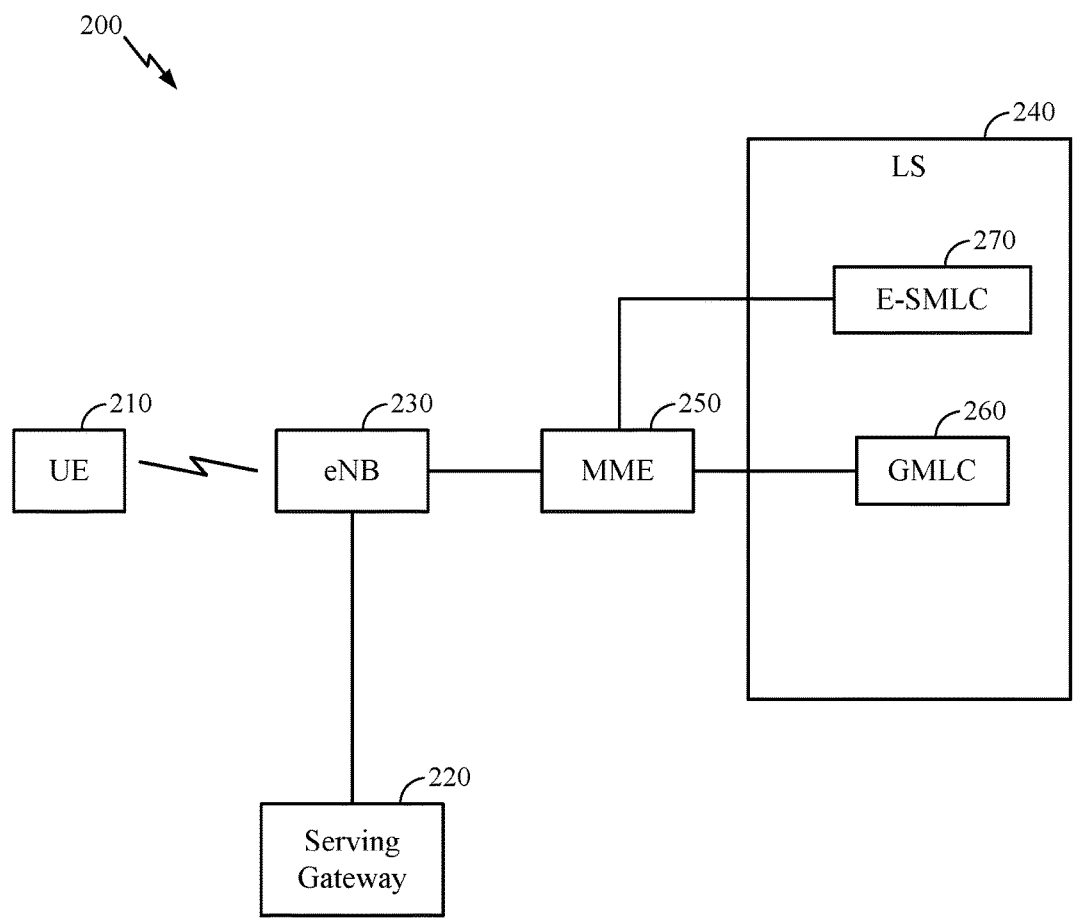
FIG. 2 is a schematic diagram of a network architecture capable of supporting the determining of a location of a UE according to an embodiment.

FIG. 2 is a schematic diagram of a network architecture 200 to support the determining of a location of a UE 210 (such as, for example, mobile device 100 of FIG. 1) which is operating on an LTE serving network according to an embodiment. Here, and as described in particular implementations below, the determining of a location of UE 210 may be supported with a user plane location solution such as the OMA SUPL solution using a serving gateway 220. Alternatively, the determining of a location of UE 210 may be supported using a control plane location solution using a MME 250 in communication with a GMLC 260 and an E-SMLC 270 functioning as a location server (LS) 240.

In this context, a user plane location solution may be facilitated with an exchange of messages in transactions occurring in entities typically accessible by UE 210 for services such as voice and data through eNB 230 (i.e., evolved base station or eNodeB) and serving gateway 220. A control plane solution, on the other hand, may be facilitated by an exchange of signaling messages over interfaces and using protocols that are supported for normal network operation as well as for location determination. Furthermore, one or more entities typically facilitating a user plane location solution (e.g., serving gateway 220) may be bypassed in a control plane location solution by use of other entities such as MME 250 to communicate directly with location server (LS) 240.

Network architecture 200 may use LPP for positioning, for example, and may use enhancements to LPP as described herein. Under traditional LPP, LPP elementary messages (e.g., Request and Provision of Capabilities and Location Information and Assistance Data) may each include a container, an external protocol data unit (EPDU), which may be used by standardization for outside 3GPP to define other extensions to LPP messages. OMA LPP Extensions (LPPe) may take advantage of this option. It is believed that LPPe is being defined by OMA and may be used in combination with LPP such that each combined LPP/LPPe message may be an LPP message (as defined in 3GPP TS 36.355) containing an embedded LPPe message. Techniques discussed herein may be used with LLP as well as LPPe. As used herein LPP (in a context of use in a control plane environment) includes LPPe and may be referred to as LPP/LPPe or simply LPP.

To enable end-to-end message flows in a single LPP positioning session between a location server and a UE, for both Control Plane and User Plane solutions, particular implementations may be directed to changes to, modifications to, additions to or extensions of standardized approaches and additional (explicit and/or implicit) procedures for a UE and associated network nodes on LTE networks. For example, changes, extensions, modifications or additions may be applied to 3GPP TS 36.355. Changes, modifications, additions or extensions may also be applied to an LCS-AP (Location Services Application Protocol) specification (3GPP TS 29.171) that defines a control plane protocol used in a LTE network between a MME and an E-SMLC for positioning of a UE.

A session may be a semi-permanent, interactive information interchange (sometimes referred to as a dialogue), a conversation or a meeting, between two or more communicating devices, or between a computer and human user. A session may be set up or established at a certain point in time, and then may be discontinued or cleaned up or torn down at some later point. An established communication session may involve more than one message in each direction. A session frequently may be stateful, i.e., that at least one of the communicating parts needs to save information about the session history in order to be able to communicate. (On the other hand a stateless communication may be where the communication consists of independent requests with responses.)

For example in the context of an information exchange among devices for purposes of deriving an estimated location of a device, a session may be an information exchange between two endpoints for the purposes of obtaining location related measurements (e.g., positioning measurements) or obtaining a location estimate or to transfer positioning assistance data (AD). An endpoint may include a type of communication node which can call and be called, and which may generate and terminate an information stream. A single LPP session may be used to support a single location request (e.g., a single mobile-originated location request (MO-LR), a single mobile-terminated location request (MT-LR) or a single network-induced location request (NI-LR)).

A session may comprise one or more transactions. Transactions within a session may be said to be transactions of or belonging to that session. A transaction may be the performance of an operation conducted within and in support of its session. For example a transaction may comprise an operation involving the exchange of capabilities of devices. Capabilities in this context may refer to positioning and protocol capabilities related to LPP and the positioning methods supported by LPP. One transaction (e.g., often an initial transaction) of a location session may be a capability exchange (e.g., LPP Request/Provide Capabilities). This information exchange can make a server aware of the positioning capabilities of a UE (e.g., GNSS support, supported cellular network measurements, etc.). Based on this information, the server can make a decision on the positioning method to be used, based on both the UE capabilities and the requested quality-of-position (e.g., response time, accuracy).

Another type of transaction may be an operation involving positioning assistance data (AD) exchange. (Positioning assistance data (AD) is sometimes referred to as navigation assistance data or assistance data.) One purpose of such a transaction may be to enable a UE to request positioning assistance data from a server to assist in deriving an estimated position, and to enable the server to transfer AD to the UE in the absence of a request. Examples of such AD may include terrestrial almanac data or GNSS satellite data such as GNSS Almanac and/or GNSS Ephemeris information, ephemerides related data for GNSS-based positioning, reference times (e.g., GPS times), GNSS Acquisition Assistance and UTC Time, GNSS Auxiliary information, ionosphere models, current GPS constellation for a UE's location, information on satellite orbits, frequency shifts in GPS frequencies due to Doppler effects, reference locations of transmitters, identities or locations of available wireless transmitters, expected received signal strength indicator (RSSI) values, OTDOA Assistance, expected round trip time (RTT) and/or round trip delay (RTD) values, other types of heat map or radio map values, and clock or time offset values.

Yet another type of transaction may be an operation involving location information exchange. This transaction may include messages whereby a server requests a UE to provide certain types of location-related information (e.g. positioning measurements) dependent upon the positioning method being used (e.g., assisted GNSS, observed TDOA, E-CID, etc.) and based upon measurements made by the UE. Other requested information from a UE may be a request for a rough or coarse estimate of the UE's position as may be preliminarily determined by the UE and which may be used for developing an improved positioning estimate of the UE. The location information exchange transaction further may include messages whereby the UE transmits to the server the location-related information that had been requested as well as unsolicited location information.

A LPP transaction may comprise one or more LPP messages exchanged between a location server and a UE (e.g., a smart phone or other mobile device) which perform a single function (e.g., transfer of LPP capabilities from a UE to a server, provision of positioning assistance data (AD) from a server to a UE or transfer of location or positioning measurements or a location estimate from a UE to a server). LPP transactions within a session may occur serially or in parallel. A LPP transaction may be identified by a transaction identification (ID), one purpose of which may be to associate messages with one another (e.g., request and response). Messages within a transaction (i.e., messages of or belonging to a transaction) may be linked by a common transaction ID. Transactions may also be referred to as procedures, and both terms are used synonymously herein.

A LPP message type may contain certain kinds of information in a message body field. LPP message types may include:

(1) Request Capabilities ("RequestCapabilities") which may be for use by the location server to request the UE capability information for LPP and the supported individual positioning methods.
(2) Provide Capabilities ("ProvideCapabilities") which may be for indicating the LPP capabilities of the UE to the location server.
(3) Request Assistance Data ("RequestAssistanceData") which may be for use by the UE to request positioning assistance data from the location server.
(4) Provide Assistance Data ("ProvideAssistanceData") which may be for use by the location server to provide positioning assistance data to the UE either in response to a request from the UE or in an unsolicited manner
(5) Request Location Information ("RequestLocationInformation") which may be for use by the location server to request positioning measurements or a position estimate from the UE.
(6) Provide Location Information ("ProvideLocationInformation") which may be for use by the UE to provide positioning measurements or position estimates to the location server.
(7) Error ("Error") which may carry information concerning a LPP message that was received with errors.
(8) Abort ("Abort") which may carry a request to abort an ongoing LPP procedure.

An LPP message may carry an acknowledgment request and/or an acknowledgement indicator. Upon reception of a LPP message which includes the acknowledgment request, the receiving endpoint may return a LPP message with an acknowledgement response. An acknowledgment response may contain no LPP message body, or alternatively may be sent in a LPP message along with a LPP message body. In some embodiments an acknowledgment may be returned for each received LPP message including any duplicate. Once a sender receives an acknowledgment for a LPP message, the sender may be permitted to send the next LPP message.

The LPP may include an abort procedure, one purpose of which may be to allow an endpoint to abort (i.e., to terminate) an ongoing procedure due to some unexpected event such as, for example, a cancellation of a location request by a location services (LCS) client. It may also be used to stop an ongoing procedure such as, for example, periodic location reporting from a UE.

The abort procedure may be initiated while an ongoing procedure is occurring between two endpoints. If one of the endpoints determines that the ongoing procedure should be aborted, that endpoint may send an abort message to the other endpoint. This abort message may carry the transaction ID for the ongoing transaction. Upon receiving the abort message, the other endpoint may abort the ongoing transaction associated with the transaction ID carried in the abort message.

The abort procedure handling or processing in various different LPP call flows may be quite important to the overall development of an estimate of a location of a UE. However in some instances there may be unexpected errors at either or both of the two endpoints caused by abort messages. Accordingly embodiments disclosed herein include enhanced or specific handling or processing of abort procedures during certain LPP sessions.

One example of unwanted network behavior may arise when abort messages are sent during multiple LPP sessions in certain instances. In one example (which may arise under the existing LPP), there may be an ongoing LPP session where a server has delivered positioning assistance data (AD) to a UE and has requested a location from the UE. According to this example, a new LPP session with a different transaction ID may be started by the server and without aborting the ongoing LPP session. At this point the UE, which may support only a single LPP session, may terminate the ongoing LPP session by sending an abort message to the server and then proceed to honor or execute the new or second LPP session. This sending of the abort message to the server may cause a network error on the server side, which in turn may cause the server to end both the old and new sessions.

According to an embodiment, a UE may not send an abort message to a server while a new session request arrives.

Instead the UE may clean up the ongoing session internally and continue to honor or execute the new request. This may reduce the chances of an error occurring on the network (server) side. (As used herein, "clean up" or "cleaning up" generally may refer to the releasing or freeing up of system resources or device resources.)

Figure 3:
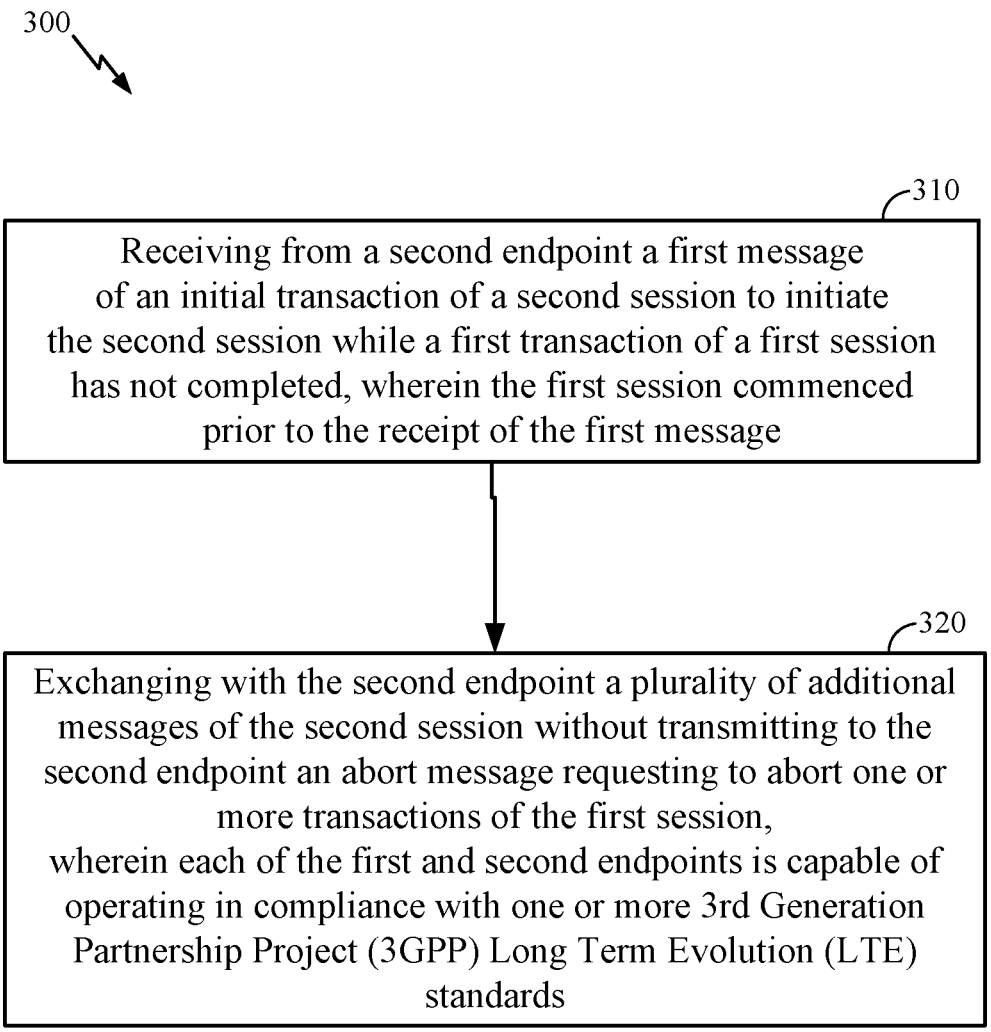
FIG. 3 is a flow diagram of a process for executing a protocol session between endpoints according to an embodiment.

FIG. 3 is a flow diagram of a process for executing a protocol session 300 between a first endpoint and a second endpoint according to an embodiment. In one particular implementation, the first endpoint may comprise a UE and the second endpoint may comprise an E-SMLC (e.g. E-SMLC 220 of FIG. 2) or server. In an alternative implementation, the second endpoint may comprise the UE and the first endpoint may comprise the E-SMLC or server. At block 310, the first endpoint may receive from the second endpoint a first message of an initial transaction of a second session to initiate the second session while a first session has not completed, and therefore the first session may be ongoing. (In other words the first session may have commenced prior to the receipt of the first message.) The transaction may be an initial transaction of the second session, and therefore the first message may initiate the transaction and the second session.

At block 320 the first endpoint may exchange with the second endpoint a plurality of additional messages of the second session. These additional messages may be exchanged without the first endpoint transmitting to the second endpoint an Abort message requesting to abort one or more transactions of the first session. That is, there is no transmission of the Abort message during a time period between the receipt of the first message of the transaction of the second session and a commencement of the exchanging of the plurality of additional messages belonging to the second session. According to an embodiment, each of the first and second endpoints may be capable of operating in compliance with particular aspects of one or more 3GPP LTE standards. According to another embodiment the first endpoint may comprise a UE and the second endpoint may comprise a server. During the time period between the receipt of the first message of the initial transaction of the second session and the commencement of the exchanging of the plurality of additional messages, the UE may clean up the first session, without sending the Abort message for aborting the one or more transactions of the first session during the time period.

According to an alternative embodiment, a mobile device is for communicating with a server and comprises a transceiver for wirelessly transmitting messages to and wirelessly receiving messages from a communication network in communication with the server. The mobile device further comprises one or more processors in communication with the transceiver. The one or more processors are configured to obtain from the server a first message of an initial transaction of a second session to initiate the second session while a first session has not completed. The first session had commenced prior to the receipt of the first message. The one or more processors are further configured to initiate an exchange with the server of a plurality of additional messages of the second session without initiating a transmission to the server of an abort message requesting to abort one or more transactions of the first session.

In an aspect of the above embodiment, the initiating of the exchange with the server of the plurality of additional messages without initiating the transmission of the abort message further includes initiating the exchange with the server of the plurality of additional messages without initiating the transmission of the abort message during a time period between the obtaining of the first message of the initial transaction of the second session and a commencement of the exchanging of the plurality of additional messages of the second session.

In a further aspect of the above embodiment, the mobile device and the server are each capable of operating in compliance with one or more 3rd Generation Partnership Project (3GPP) Long Term Evolution (LTE) standards.

In a further aspect of the above embodiment, the one or more processors are further configured to, during the time period between the obtaining of the first message of the initial transaction of the second session and the commencement of the exchanging of the plurality of additional messages, clean up, at the mobile device, the first session.

In a further aspect of the above embodiment, the first message comprises a LTE Positioning Protocol (LPP) message communicated in accordance with LPP and the second transaction comprises a LPP transaction conducted in accordance with LPP.

Figure 4:
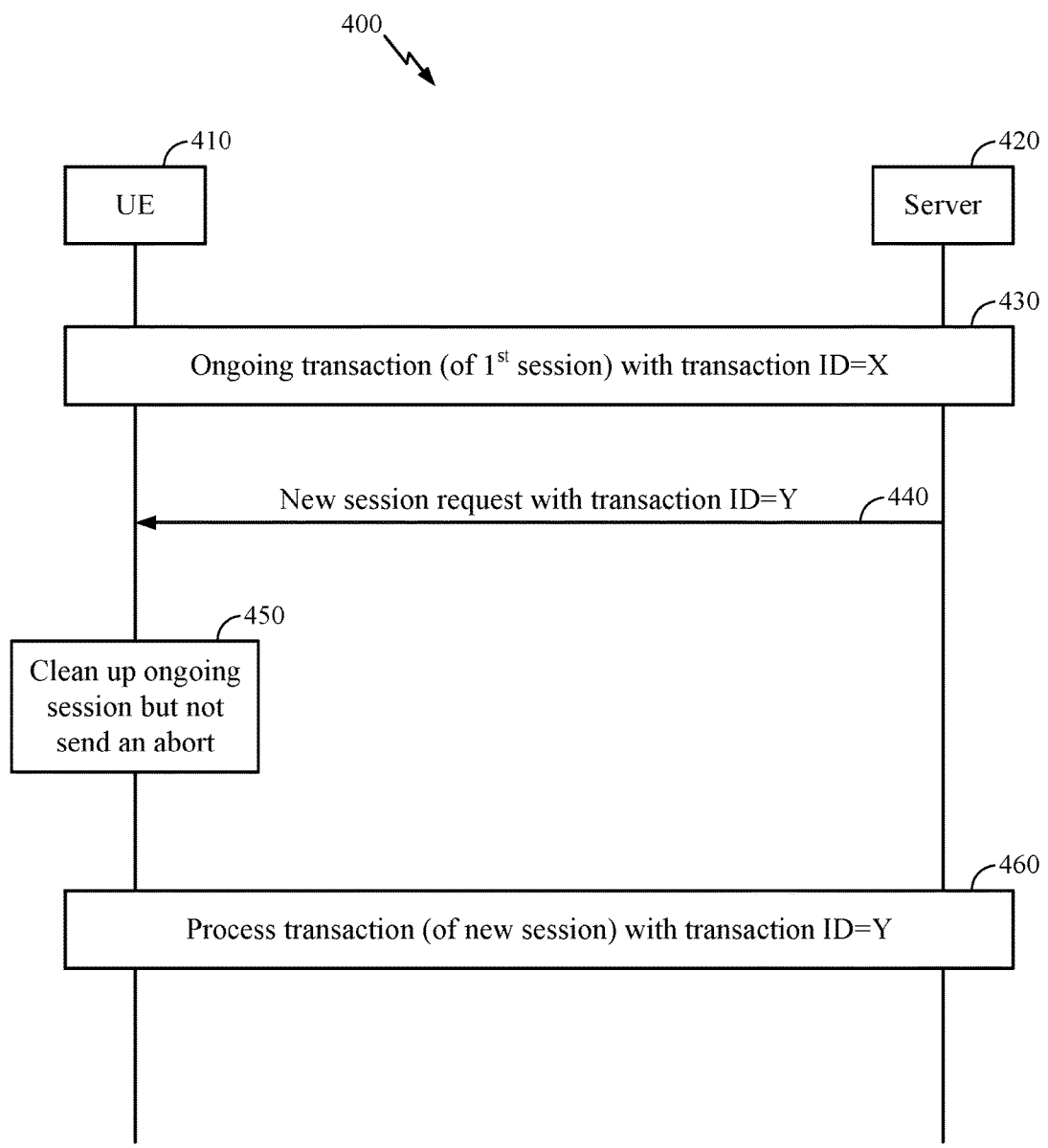
FIG. 4 illustrates an example message call flow between a UE and a server in accordance with an embodiment.

FIG. 4 illustrates an example message call flow 400 between a UE 410 and a server 420 in accordance with an embodiment. UE 410 may correspond to mobile device 100 in FIG. 1 and server 420 may correspond to any of servers 140, 150 and 155 in FIG. 1. Message call flow 400 may be used in some embodiments in association with a control plane location solution such as the 3GPP control plane location solution for LTE. In these embodiments, server 420 may correspond to E-SMLC 270 of FIG. 2 and UE 410 may correspond to UE 210 of FIG. 2. Alternatively message call flow 400 may be used in other embodiments in association with a user plane location solution such as SUPL.

At Stage 430 an ongoing transaction (which has a transaction ID "X") of a first session is in progress. At Stage 440 server 420 sends to UE 410 a message indicating a request for a second session (i.e., a new session) including a transaction having a transaction ID "Y." As noted at reference numeral 450, UE 410 does not send an abort message (for aborting ongoing transaction X of the first session) to server 420, despite the earlier receipt by UE 410 of the message indicating the request to initiate the second session. (The sending of such an abort message at this point in a message call flow is what may occur under the traditional LPP.) Instead however UE 410 cleans up the first session without sending the abort message.

At Stage 460 server 420 and UE 410 may process the transaction (of the second session) having transaction ID "Y". Server 420 and UE 410 may exchange a plurality of additional messages, some or all of which may belong to the transaction having ID "Y" and/or some or all of which may belong to other transactions, if any, of the second session. Thus UE 410 does not send an abort message (for aborting ongoing transaction X of the first session) to server 420 during the time period between the receipt of the message at Stage 440 and the commencement of the exchanging of the plurality of additional messages, some or all of which may belong to the transaction having ID "Y" and/or some or all of which may belong to other transactions, if any, of the second session.

Another instance of an unexpected or unwanted error may arise while an abort message is sent for aborting a LPP transaction which has not been serviced after a predetermined amount of time has elapse, e.g., after a timeout period. Generally a LPP transaction which has not been serviced for a specific amount of time may have to be aborted and cleaned up in order to release resources which have been allotted.

An example call flow where this problem may arise may be one where a server sends a request to a UE for its location estimate, but the server does not provide complete positioning assistance data or any positioning assistance data to the UE. The UE may send a subsequent request for the positioning assistance data, but there may be no response from the server due to the assistance data not being available, for example. In such a scenario the request for the assistance data may have an associated second timeout period that expires prior to an expiration of any first timeout period associated with the location estimate request.

In one implementation of LPP the expiration of the second timeout period may result in the sending by the UE of an abort message for aborting the transaction associated with its request for the positioning assistance data. However the receipt by the server of this abort message may give rise to an error on the network side due to the unexpected nature of the abort message, and this in turn may bring about an unwanted termination of the entire session. The foregoing is an exemplary call flow only and there may be other types of call flows where a message for aborting a LPP transaction which has not been serviced within a timeout period or predetermined time may bring about an error on a network and/or may bring about an unwanted termination of a session.

Figure 5:
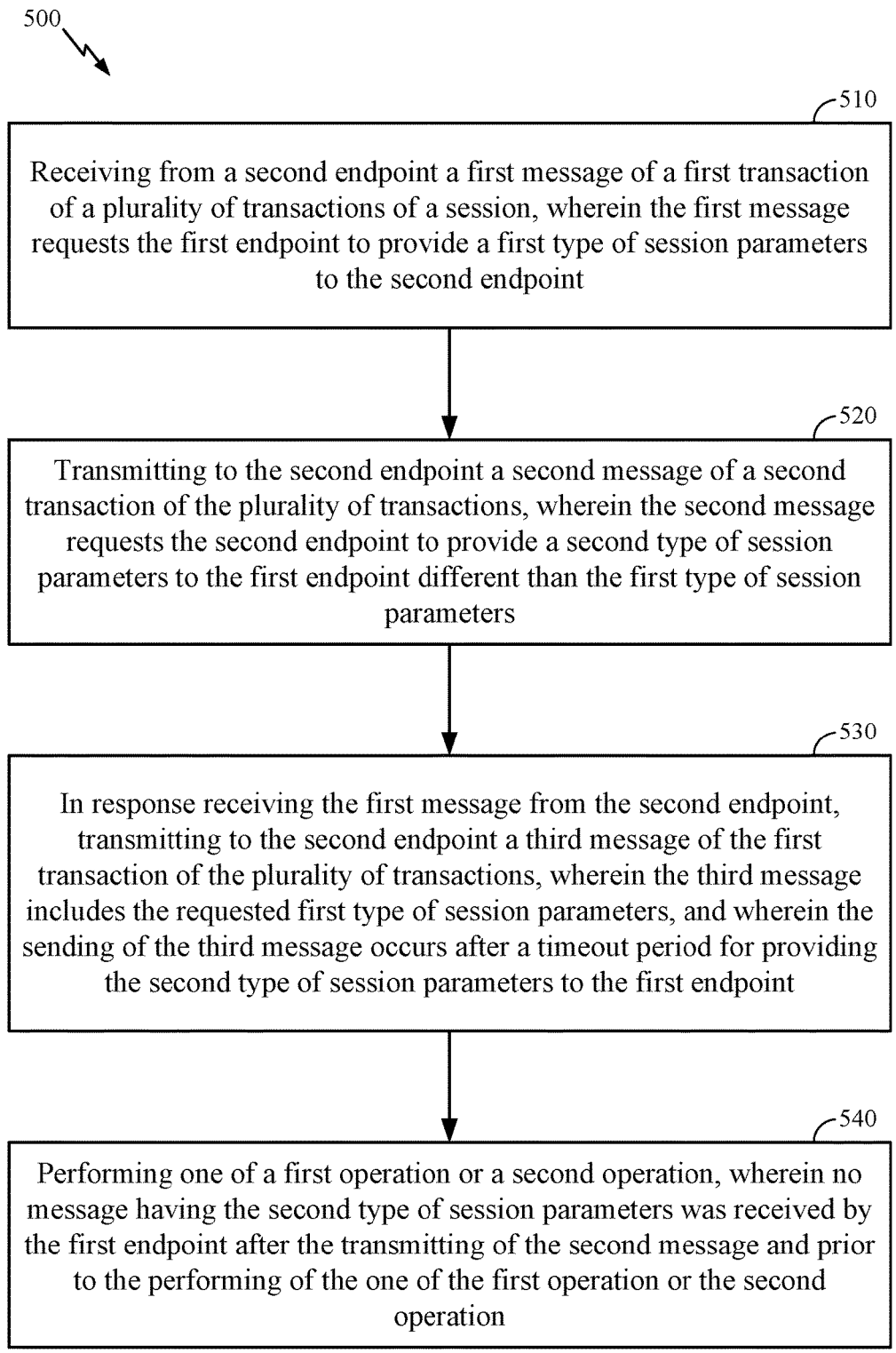
FIG. 5 is a flow diagram illustrating interactions between endpoints according to another embodiment.

FIG. 5 is a flow diagram illustrating interactions 500 between a first endpoint and a second endpoint according to an embodiment. In one particular implementation, the first endpoint may comprise a UE and the second endpoint may comprise an E-SMLC (e.g. E-SMLC 220 of FIG. 2) or server. In an alternative implementation, the second endpoint may comprise the UE and the first endpoint may comprise the E-SMLC or server. At block 510 the first endpoint receives from the second endpoint a first message of a first one of a plurality of transactions of a session, wherein the first message requests the first endpoint to provide a first type of session parameters or information to the second endpoint. Session parameters may include information used, directly or indirectly, for a determination of an estimated location of a device and may include, for example, a positioning measurement taken by a UE, an estimate of a position of a UE, the capabilities of a UE for using or supporting specific types of positioning methods, positioning assistance data (AD), etc. Positioning measurement taken by a UE may include measurements of signals and/or their characteristics, which such measurements may be used for the development of an estimated location of the UE, and may include measurements of signals (and/or their characteristics) received from satellites belonging to an SPS or GNSS, such as GPS, GLONASS, Galileo or Beidou, and/or may include measurements of signals (and/or their characteristics) received from terrestrial transmitters (e.g., such as cellular transceivers, access points, etc.).

At block 520 the first endpoint transmits to the second endpoint a second message of a second one of the plurality of transactions. The second message requests the second endpoint to provide a second type of session parameters or information to the first endpoint different than the first type of session parameters. At block 530, in response to receiving the first message from the second endpoint, the first endpoint may transmit to the second endpoint a third message of the first one of the plurality of transactions. The third message may include the requested first type of session parameters. The transmitting of the third message occurs after a timeout period for providing the second type of session parameters to the first endpoint.

At block 540, the first endpoint performs one of a first operation or a second operation. No message having the second type of session parameters was received by the first endpoint after the transmitting of the second message and prior to the performing of the one of the first operation or the second operation. The first operation comprises transmitting to the second endpoint a fourth message requesting to abort the second one of the plurality of transactions. The second operation comprises cleaning up, at the first endpoint, the second one of the plurality of transactions without transmitting to the second endpoint the fourth message requesting to abort the second one of the plurality of transactions. According to an embodiment, each of the first and second endpoints is capable of operating in compliance with one or more 3GPP LTE standards. According to another embodiment, the first, second and third messages are LPP messages communicated in accordance with LPP According to yet another embodiment, the first endpoint comprises the UE and the second endpoint comprises the server. The request of the first message for the first type of session parameters comprises a request for either a positioning measurement taken by the UE or an estimate of the position of the UE. The request of the second message for the second type of session parameters comprises a request for positioning assistance data. The first type of session parameters in the third message sent to the server comprises that which had been requested in the first message, i.e., the positioning measurement taken by the UE or the estimate of the position of the UE.

According to an alternative embodiment, a mobile device is for communicating with a server and comprises a transceiver for wirelessly transmitting messages to and wirelessly receiving messages from a communication network in communication with the server. The mobile device further comprises one or more processors in communication with the transceiver. The one or more processors are configured to obtain from the server a first message of a first transaction of a plurality of transactions of a session. The first message requests the mobile device to provide a first type of session parameters to the server.

The one or more processors are further configured to initiate transmission to the server of a second message of a second transaction of the plurality of transactions, wherein the second message requests the server to provide a second type of session parameters to the mobile device different than the first type of session parameters.

The one or more processors are further configured to, in response to the first message from the server, initiate transmission to the server of a third message of the first transaction of the plurality of transactions. The third message includes the requested first type of session parameters. The initiating of the transmission of the third message occurs after a timeout period for providing the second type of session parameters to the mobile device.

The one or more processors are further configured to perform one of a first operation or a second operation, wherein no message having the second type of session parameters was obtained by the mobile device after the initiating of the transmission of the second message and prior to the performing of the one of the first operation or the second operation. The first operation comprises initiating transmission to the server of a fourth message requesting to abort the second transaction of the plurality of transactions. The second operation comprises cleaning up, at the mobile device, the second transaction of the plurality of transactions without initiating transmission to the server of the fourth message requesting to abort the second transaction of the plurality of transactions.

According to an aspect of the above embodiment, the mobile device and the server are each capable of operating in compliance with one or more 3rd Generation Partnership Project (3GPP) Long Term Evolution (LTE) standards.

According to a further aspect of the above embodiment, the first type of session parameters comprises one of a positioning measurement taken by the mobile device and an estimate of the position of the mobile device, and wherein the second type of session parameters comprises positioning assistance data.

According to further aspect of the above embodiment, the first, second and third messages comprise LTE Positioning Protocol (LPP) messages communicated in accordance with LPP.

Figure 6:
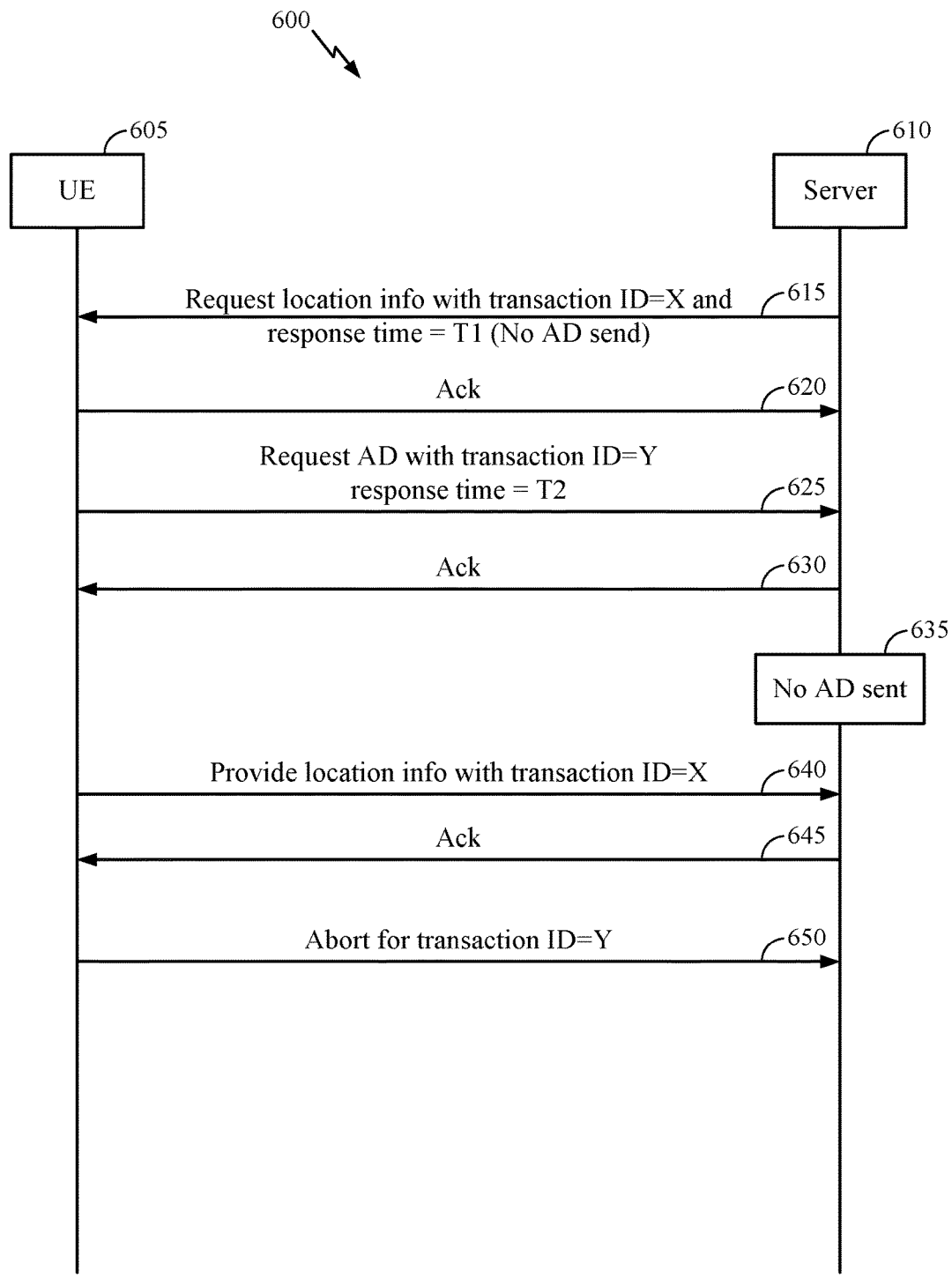
FIG. 6 illustrates an example message call flow between a UE and a server in accordance with another embodiment.

FIG. 6 illustrates a call flow 600 between a UE 605 and a server 610 in accordance with an embodiment. At Stage 615 server 610 sends to UE 605 a request message (carrying transaction ID "X") seeking an estimate of the position or location of UE 605. Associated with this request may be a response time T1 by which UE 605 should provide the requested location information. At the time that this request message is sent, no positioning assistance data (AD) has been provided to UE 605. In response to this request, UE 605 sends an acknowledgment message to server 610. (Stage 620)

At Stage 625, UE 605 sends to server 610 a message requesting positioning assistance data (AD) from server 610. This request message is pursuant to a different transaction and carries transaction ID "Y." Associated with this request message is a predetermined response time T2 by which server 610 may be expected to provide the requested AD. Server 610 may respond to this message by sending an acknowledgment message. (Stage 630) In some instances it may happen that the response time T2 is less than the response time T1 of the message of Stage 615. According to traditional LPP (and not according to the embodiment of FIG. 6), in this event UE 605 may send an abort message for aborting transaction ID "Y" after response time T2 has elapsed, in the event the assistance data was not timely sent (as represented by reference numeral 635 of FIG. 6). However should such an abort message be sent at this stage in a call flow, this may give rise to an error in the network due to the unexpected abort message, which in turn may end the entire session. On the other hand in the embodiment of FIG. 6, an abort message is not sent at this point in call flow 600.

Still referring to FIG. 6, at Stage 640 UE 605 sends to server 610 a message that provides location parameters or information of UE 605 as derived by UE 605 without the positioning assistance data that had been requested at Stage 625. (Alternatively this message may comprise an error message saying no measurements were possible if no location fix was made by UE 605 at timeout.) The message providing the location parameters (or alternatively the error message) is in response to the request at Stage 615 and carries transaction ID "X". Server 610 may send an acknowledgment message to UE 605 in response to receipt of the message providing the location parameters (or providing the error message). (Stage 645) Then at Stage 650, UE 605 may send to server 610 an abort message carrying transaction ID "Y" in order to abort this transaction associated with the request at Stage 625 for the assistance data. Thus the request for assistance data transaction can be kept open even after sending the provide location message, and the abort message may be used later to clean up this transaction and may not be sent until a request for a new session is received, for example.

Another instance of unwanted network behavior may arise while abort messages are transmitted which include acknowledgment requests. Under the existing LPP, for example, a mobile device (or other user equipment (UE)) may include a request for acknowledgement (ACK) while an Abort message may be transmitted to a server. If the ACK is not received from the server, the abort message is retransmitted to the server after waiting for a predetermined amount of time. In some instances this retransmission of the abort message may occur multiple times. This may not be an efficient use of resources, since the mobile device and network resources are both used to retransmit or process an abort message which technically may mean an end of the ongoing LPP session.

FIG. 7 is a diagram illustrating interactions 700 between a first endpoint and a second endpoint according to an embodiment. In one particular implementation, the first endpoint may comprise a UE and the second endpoint may comprise an E-SMLC (e.g. E-SMLC 220 of FIG. 2) or server. In an alternative implementation, the second endpoint may comprise the UE and the first endpoint may comprise the E-SMLC or server. At block 710 a first endpoint transmits to a second endpoint a first message of a first transaction of a first session. The first message may include a request to abort the first transaction; however the first message may not include a request from the second endpoint for an acknowledgment message for acknowledging receipt of the abort message. According to an embodiment, each of the first and second endpoints may be capable of operating in compliance with one or more aspects of one or more 3GPP LTE standards.

According to an alternative embodiment, after the first endpoint transmits the first message, the first endpoint may clean up the first transaction.

According to another alternative embodiment, the first endpoint may comprise the UE and the second endpoint may comprise the server. The first transaction comprises a request for assistance data (e.g., for positioning AD) sent by the UE to the server, or alternatively the first transaction comprises a request for location information (e.g., for positioning measurements or for a position estimate) sent from the server to the UE.

According to an alternative embodiment, a mobile device is for communicating with a server and comprises a transceiver for wirelessly transmitting messages to and wirelessly receiving messages from a communication network in communication with the server. The mobile device further comprises one or more processors in communication with the transceiver. The one or more processors are configured to initiate transmission to the server of a first message of a first transaction of a first session. The first message includes a request to abort the first transaction, The first message does not include a request for an acknowledgment message from the server. The mobile device and the server are each capable of operating in compliance with one or more 3rd Generation Partnership Project (3GPP) Long Term Evolution (LTE) standards.

In an aspect of the above embodiment, the first transaction comprises a request for positioning assistance data (AD) sent by the mobile device to the server, or comprises a request for positioning measurements sent from the server to the mobile device, or comprises a request for a position estimate sent from the server to the mobile device.

In a further aspect of the above embodiment, the one or more processors are further configured to, after the initiating of the transmission of the first message, clean up, at the mobile device, the first transaction.

Figure 8:
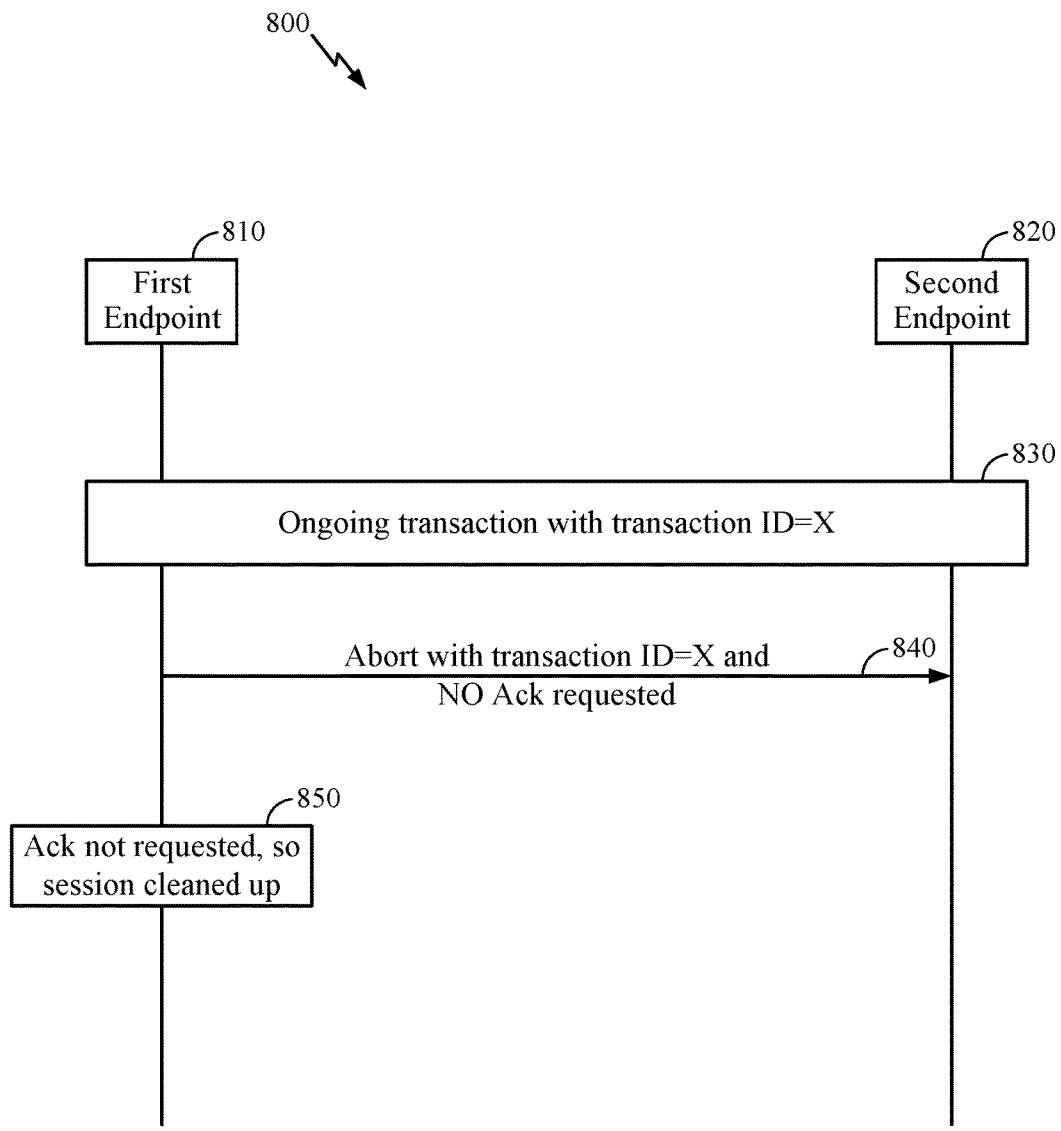
FIG. 8 illustrates an example message call flow between endpoints in accordance with another embodiment.

FIG. 8 illustrates an example call flow between a first endpoint 810 and a second endpoint 820 in accordance with an embodiment. At Stage 830 an ongoing LPP session is in progress which includes a transaction having a transaction ID "X". At Stage 840 first endpoint 810 sends to second endpoint 820 an abort message carrying transaction ID "X". However no acknowledgement request is included in this abort message. (The sending of an abort message that includes an acknowledgement request is what may occur under the traditional LPP.) As indicated at reference numeral 850 of FIG. 8, however, the session may be aborted and cleaned up, since no acknowledgment has been requested. Therefore the system need not wait for any such acknowledgment message which, as described above, may not arrive at all or may not arrive until one or more retransmissions of an abort message (having an acknowledgement request) had been sent.

Yet another instance of unwanted network behavior may arise while an abort message is received, wherein this message has a wrong transaction ID or has no transaction ID. Under traditional LPP if an abort message having a wrong or no transaction ID is sent by either endpoint during an ongoing LPP transaction of an ongoing LPP session, this may give rise to an erroneous and unwanted termination and/or cleaning up of the ongoing LPP transaction and the LPP session. This may occur despite the fact that the abort message has a transaction number that is different from any ongoing LPP transaction of a LPP session or despite the fact that the abort message contains no transaction number at all. According to an embodiment however the endpoint which received this type of message in effect may ignore the abort message and continue to complete the ongoing transactions and session.

FIG. 9 is a flow diagram illustrating interactions 900 between a first endpoint and a second endpoint according to an embodiment. In one particular implementation, the first endpoint may comprise a UE and the second endpoint may comprise an E-SMLC (e.g. E-SMLC 220 of FIG. 2) or server. In an alternative implementation, the second endpoint may comprise the UE and the first endpoint may comprise the E-SMLC or server. At block 910 a first endpoint receives from a second endpoint a first message. One or more transactions of a first session are ongoing at the time of the receiving of the first message. The one or more transactions have one or more transaction identifications. The first message includes a request to abort a transaction and includes a transaction identification that is other than any one of the one or more transaction identifications of the ongoing one or more transactions.

At block 920, after the receiving of the first message the first endpoint completes the one or more transactions by exchanging with the second endpoint one or more additional messages of the one or more transactions. According to an embodiment each of the first and second endpoints is capable of operating in compliance with one or more 3GPP LTE standards.

According to another embodiment, a first endpoint receives from a second endpoint a first message. One or more transactions of a first session are ongoing at the time of the receiving of the first message. The one or more transactions have one or more transaction identifications, The first message includes a request to abort a transaction and does not include any transaction identification. After the receiving of the first message, the first endpoint completes the one or more transactions by exchanging with the second endpoint one or more additional messages of the one or more transactions. According to an aspect of this embodiment, each of the first and second endpoints is capable of operating in compliance with one or more 3rd Generation Partnership Project (3GPP) Long Term Evolution (LTE) standards.

According to another embodiment, a mobile device is for communicating with a server and comprises a transceiver for wirelessly transmitting messages to and wirelessly receiving messages from a communication network in communication with the server. The mobile device further comprises one or more processors in communication with the transceiver. The one or more processors are configured to receive from the server a first message, wherein one or more transactions of a first session are ongoing at the time of the receiving of the first message. The one or more transactions have one or more transaction identifications. The first message includes a request to abort a transaction and further includes a transaction identification that is other than any one of the one or more transaction identifications.

The one or more processors are further configured to, after the receiving of the first message, complete the one or more transactions by exchanging with the server one or more additional messages of the one or more transactions.

According to an aspect of the above embodiment, the mobile device and the server are each capable of operating in compliance with one or more 3rd Generation Partnership Project (3GPP) Long Term Evolution (LTE) standards.

According to another embodiment, a mobile device is for communicating with a server and comprises a transceiver for wirelessly transmitting messages to and wirelessly receiving messages from a communication network in communication with the server. The mobile device further comprises one or more processors in communication with the transceiver. The one or more processors are configured to receive from the server a first message, wherein one or more transactions of a first session are ongoing at the time of the receiving of the first message. The one or more transactions have one or more transaction identifications. The first message includes a request to abort a transaction, and does not include any transaction identification.

The one or more processors are further configured to, after the receiving of the first message, complete the one or more transactions by exchanging with the server one or more additional messages of the one or more transactions.

According to an aspect of the above embodiment, the mobile device and the server are each capable of operating in compliance with one or more 3rd Generation Partnership Project (3GPP) Long Term Evolution (LTE) standards.

Figure 10:
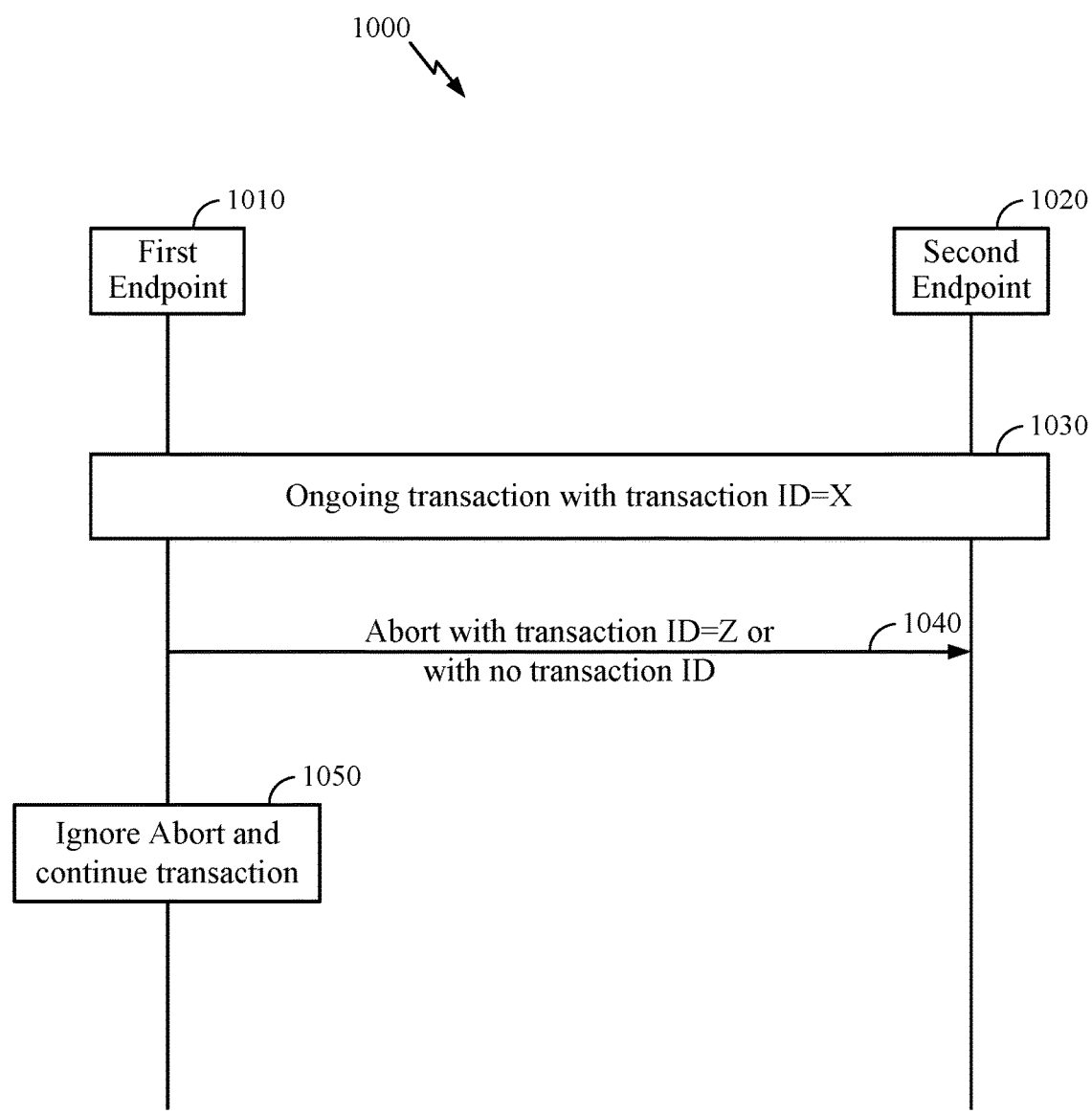
FIG. 10 illustrates an example message call flow between endpoints in accordance with another embodiment.

FIG. 10 illustrates an example call flow 1000 between a first endpoint 1010 and a second endpoint 1020 in accordance with an embodiment. At Stage 1030 an ongoing session is in progress which includes an ongoing transaction having a transaction ID "X". At Stage 1040 second endpoint 1020 transmits to first endpoint 1010 an abort message carrying transaction ID "Z". Transaction ID "Z" is not only different than transaction ID "X", but it is different from the transaction IDs of any and all other transactions that may be ongoing at the time of the sending of the abort message. (In an alternative embodiment, the abort message carries no transaction ID.) However despite the receipt by first endpoint 1010 of this abort message, first endpoint 1010 in effect may ignore this abort message and continue with the ongoing transaction having transaction ID "X" (Stage 1050) as well as continuing with any and all other ongoing transactions, if any, that may have been ongoing while the abort message is transmitted.

Figure 11:
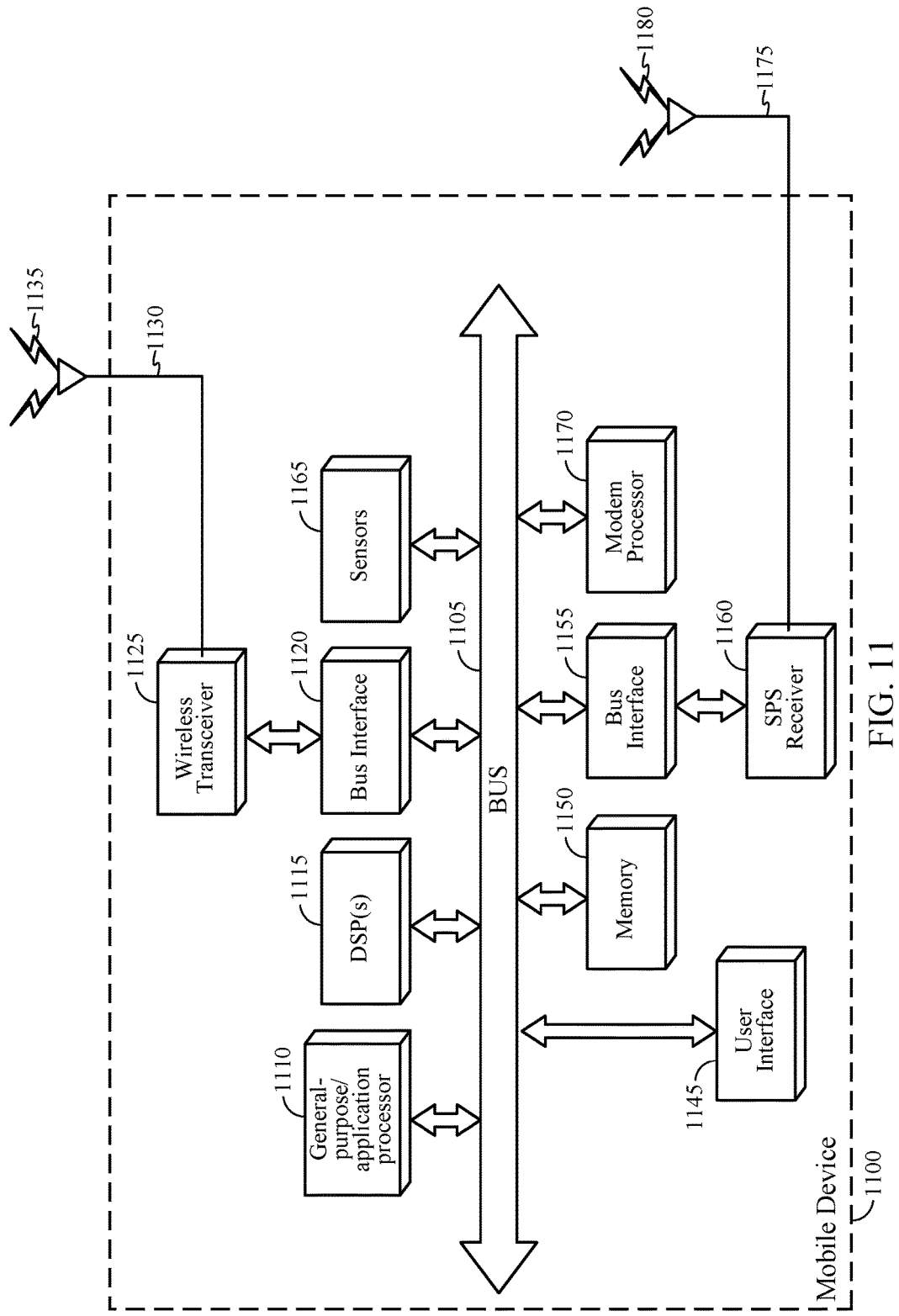
FIG. 11 is a schematic block diagram illustrating an exemplary device, in accordance with an implementation.

FIG. 11 is a schematic diagram of a mobile device 1100 such as, for example, mobile device 100 of FIG. 1, a mobile station, a UE (e.g., UE 210 of FIG. 2), a subscriber equipment (SET) or a target device, according to an embodiment. Mobile device 1100 may include one or more features of a mobile device, UE, SET or target device depicted and described in association with FIG. 1-FIG. 10. In certain embodiments, mobile device 1100 may comprise a wireless transceiver 1125 which is capable of transmitting and receiving wireless signals 1135 via wireless antenna 1130 over a wireless communication network; for example, wireless transceiver 1125 may be used to establish communication to an LS (e.g., LS 240 of FIG. 2) and/or other entities, via an eNB (e.g., eNB 230 of FIG. 2) and other network infrastructure.

Wireless transceiver 1125 may be connected to bus 1105 by a wireless transceiver bus interface 1120. Wireless transceiver bus interface 1120 may, in some embodiments be at least partially integrated with wireless transceiver 1125. Some embodiments may include multiple wireless transceivers 1125 and wireless antennas 1130 to enable transmitting and/or receiving signals according to corresponding multiple wireless communication standards such as, for example, versions of IEEE Std. 802.11, CDMA, WCDMA, LTE, UMTS, GSM, Advanced Mobile Phone System (AMPS), ZigBee and Bluetooth, just to name a few examples.

Mobile device 1100 may also comprise a SPS receiver 1160 in communication with bus 1105 via a bus interface 1155. SPS receiver 1160 is capable of receiving and acquiring SPS signals 1180 via a SPS antenna 1175. SPS receiver 1160 may also process, in whole or in part, acquired SPS signals 1180 for estimating a location of mobile device 1100. In some embodiments, general-purpose processor(s) 1110, memory 1150, digital signal processors (DSP(s)) 1115 and/or specialized processors (not shown) may also be utilized to process acquired SPS signals, in whole or in part, and/or calculate an estimated location of mobile device 1100, in conjunction with SPS receiver 1160. Storage of SPS or other signals (e.g., signals acquired from wireless transceiver(s) 1125) for use in performing positioning operations may be performed in memory 1150 or registers (not shown). As such, general-purpose processor(s) 1110, memory 1150, DSP(s) 1115 and/or specialized processors may provide a positioning engine for use in processing measurements to estimate a location of mobile device 1100.

In various embodiments, functions may be performed in response execution of one or more machine-readable instructions stored in memory 1150 such as on a computer-readable storage medium, such as RAM, ROM, FLASH, or disc drive, just to name a few examples. The one or more instructions may be executable by general-purpose processor(s) 1110, specialized processors, or DSP(s) 1115. Memory 1150 may comprise a non-transitory processor-readable memory and/or a computer-readable memory that stores software code (programming code, instructions, etc.) that are executable by processor(s) 1110 and/or DSP(s) 1115 to perform functions described herein.

Also shown in FIG. 11, a user interface 1145 may comprise any one of several devices such as, for example, a speaker, microphone, display device, vibration device, keyboard, touch screen, just to name a few examples. User interface may instead be supported via TCP/IP or other means to a remote user. In a particular implementation, user interface 1145 may enable a user or an operation and management (O&M) system to interact with one or more applications hosted on mobile device 1100. For example, devices of user interface 1145 may store analog or digital signals in memory 1150 to be further processed by DSP(s) 1115 or general purpose processor 1110 in response to action from a user. Similarly, applications hosted on mobile device 1100 may store analog or digital signals in memory 1150 to present an output signal to a user.

Mobile device 1100 may also comprise environment sensors 1165, such as for example, temperature sensors, barometric pressure sensors, ambient light sensors, camera imagers, microphones, just to name few examples. Sensors 1165 may generate analog or digital signals that may be stored in memory 1150 and processed by DPS(s) 1115 or general purpose application processor 1110 in support of one or more applications such as, for example, applications directed to positioning or navigation operations. Sensors 1165 may be used to help determine the location of mobile device 1100 and/or to provide information to an HMS or SAS to assist in determining locations of other UEs.

In a particular implementation, mobile device 1100 may comprise a dedicated modem processor 1170 capable of performing baseband processing of signals received and down converted at wireless transceiver 1125 or SPS receiver 1160. Similarly, modem processor 1170 may perform baseband processing of signals to be up converted for transmission by wireless transceiver 1125. In alternative implementations, instead of having a dedicated modem processor, baseband processing may be performed by a general purpose processor or DSP (e.g., general purpose/application processor 1110 or DSP(s) 1115). It should be understood, however, that these are merely examples of structures that may perform baseband processing, and that claimed subject matter is not limited in this respect.

Figure 12:
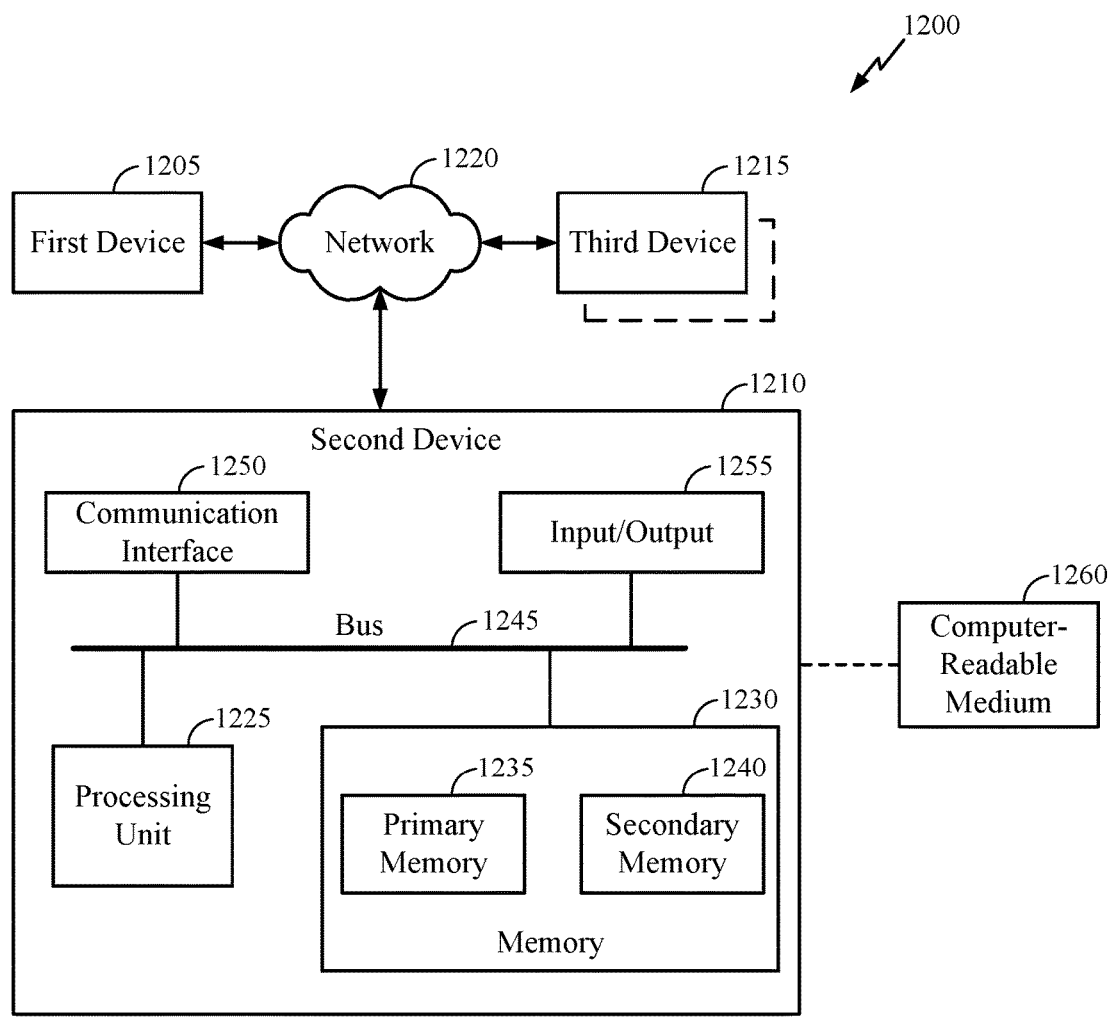
FIG. 12 is a schematic block diagram illustrating an example system configurable to implement certain techniques or processes described herein.

FIG. 12 is a schematic diagram illustrating an example system 1200 that may include one or more devices configurable to implement techniques or processes described above, for example, in connection with FIGS. 1 to 10. System 1200 may include, for example, a first device 1205, a second device 1210, and a third device 1215, which may be operatively coupled together through a wireless communications network 1220. In an aspect, second device 1210 may comprise a server such as an MME, E-SMLC, GMLC, LRF, or LS as may be depicted in FIG. 2-FIG. 10. Also, in an aspect, wireless communications network 1220 may comprise one or more wireless access points, for example.

First device 1205, second device 1210 and third device 1215, as shown in FIG. 12, may be representative of any device, appliance or machine that may be configurable to exchange data over wireless communications network 1220. By way of example but not limitation, any of first device 1205, second device 1210, or third device 1215 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 1205, 1210, and 1215, respectively, may comprise one or more of a base station almanac server, a base station, or a UE in accordance with the examples described herein.

Similarly, wireless communications network 1220 (e.g., in a particular of implementation of network 130 shown in FIG. 1), may be representative of one or more communication links, processes, or resources configurable to support the exchange of data between at least two of first device 1205, second device 1210, and third device 1215. By way of example but not limitation, wireless communications network 1220 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 1215, there may be additional like devices operatively coupled to wireless communications network 1220.

It is recognized that all or part of the various devices and networks shown in system 1200, and the processes and methods as further described herein, may be implemented using or otherwise including hardware, firmware, software, or any combination thereof.

Thus, by way of example but not limitation, second device 1210 may include at least one processing unit 1225 that is operatively coupled to a memory 1230 through a bus 1245.

Processing unit 1225 is representative of one or more circuits configurable to perform at least a portion of a data computing procedure or process. By way of example but not limitation, processing unit 1225 may include one or more processors, controllers, microprocessors, microcontrollers, application specific integrated circuits, digital signal processors, programmable logic devices, field programmable gate arrays, and the like, or any combination thereof.

Memory 1230 is representative of any data storage mechanism. Memory 1230 may include, for example, a primary memory 1235 or a secondary memory 1240. Primary memory 1235 may include, for example, a random access memory, read only memory, etc. While illustrated in this example as being separate from processing unit 1225, it should be understood that all or part of primary memory 1230 may be provided within or otherwise co-located/ coupled with processing unit 1225.

In a particular implementation, a digital map of an indoor area may be stored in a particular format in memory 1230. Processing unit 1225 may execute instructions to process the stored digital map to identify and classify component areas bounded by a perimeter of structures indicated in the digital map. As pointed out above, these executed instructions may specify identifying and characterizing egress segments in structures forming a perimeter bounding a component area and classifying the bounded component area based, at least in part, on a proportionality of a size of at least one identified egress segment to a size of at least one dimension of the bounded component area.

Secondary memory 1240 may include, for example, the same or similar type of memory as primary memory or one or more data storage devices or systems, such as, for example, a disk drive, an optical disc drive, a tape drive, a solid state memory drive, etc. In certain implementations, secondary memory 1240 may be operatively receptive of, or otherwise configurable to couple to, a computer-readable medium 1260. Computer-readable medium 1260 may include, for example, any non-transitory medium that can carry or make accessible data, code or instructions for one or more of the devices in system 1200. Computer-readable medium 1260 may also be referred to as a storage medium.

Second device 1210 may include, for example, a communication interface 1250 that provides for or otherwise supports the operative coupling of second device 1210 to at least wireless communications network 1220. By way of example but not limitation, communication interface 1250 may include a network interface device or card, a modem, a router, a switch, a transceiver, and the like.

Second device 1210 may include, for example, an input/output device 1255. Input/output device 1255 is representative of one or more devices or features that may be configurable to accept or otherwise introduce human or machine inputs, or one or more devices or features that may be configurable to deliver or otherwise provide for human or machine outputs. By way of example but not limitation, input/output device 1255 may include an operatively configured display, speaker, keyboard, mouse, trackball, touch screen, data port, etc.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), DSPs, digital signal processing devices ("DSPDs"), programmable logic devices ("PLDs"), field programmable gate arrays ("FPGAs"), processors, controllers, microcontrollers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art.

An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels.

As used herein (and unless the context clearly indicates otherwise), a message refers to an electronic communication sent via an electronic channel between two or more devices. In messaging, which may be the formal exchange of event notifications, requests, or replies between programs and/or devices, a message is data in a specified format that describes an event, a request, or a reply between programs and/or devices.

Unless specifically stated otherwise, as apparent from the discussion herein, it is appreciated that throughout this disclosure the use of terms such as "processing," "computing," "calculating," "determining", "exchanging", "receiving", "sending", "removing", "performing" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Unless specifically stated otherwise, it is appreciated that throughout this disclosure the use of terms such as "first", "second", "third", etc., is a common patent-language convention to distinguish between repeated instances of an element or limitation. Unless the context clearly indicates otherwise, these terms are to distinguish different elements of an embodiment or claim, and are not terms intended to supply a numerical limit, and are not terms to indicate that elements or limitations must appear in that order.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies.

Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a cellular transceiver device, utilized to extend cellular telephone service into a business or home. In such an implementation, one or more mobile devices may communicate with a cellular transceiver device via a code division multiple access ("CDMA") cellular communication protocol, for example.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver.

Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense.

Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

In view of the above, it will be appreciated that certain embodiments overcome many of the long-standing problems in the art by providing enhancements to a LPP transport which may improve performance where a sender or receiver of messages processes certain messages that include requests to abort transactions or sessions, or processes certain messages that might otherwise result in the sending of abort messages. Embodiments may reduce unwanted system actions such as, for example, the unwanted termination of a transaction or session, or the unnecessary use of system resources.

The particular combinations of elements and features in the above-detailed embodiments are exemplary only; the interchanging and substitution of these teachings with other teachings in this and the incorporated-by-reference documents, if any, are also expressly contemplated and intended.

While there have been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method for exchanging messages, comprising at a first endpoint:
   receiving, from a second endpoint, a first message of an initial transaction of a second session to initiate the second session while a first session has not completed, wherein the first session commenced prior to the receipt of the first message; and
   exchanging, with the second endpoint, a plurality of additional messages of the second session without transmitting to the second endpoint an abort message requesting to abort one or more transactions of the first session,
   wherein the abort message is not transmitted during a time period between the receipt of the first message of the initial transaction of the second session and a commencement of the exchanging of the plurality of additional messages of the second session, and
   wherein each of the first and second endpoints is capable of operating in compliance with one or more 3rd Generation Partnership Project (3GPP) Long Term Evolution (LTE) standards.

2. The method of claim 1, wherein the first endpoint comprises a user equipment (UE) and the second endpoint comprises a server, the method further comprising:
   during the time period between the receipt of the first message of the initial transaction of the second session and the commencement of the exchanging of the plurality of additional messages, cleaning up the first session at the UE.

3. The method of claim 1 wherein the second session includes a plurality of transactions, and wherein the plurality of transactions includes the initial transaction of the second session, the method further comprising:
   receiving, from the second endpoint, a second message of a first transaction of the plurality of transactions, wherein the second message requests the first endpoint to provide a first type of session parameters to the second endpoint;
   transmitting, to the second endpoint, a third message of a second transaction of the plurality of transactions, wherein the third message requests the second endpoint to provide a second type of session parameters to the first endpoint different than the first type of session parameters;
   in response to receiving the second message from the second endpoint, transmitting, to the second endpoint, a fourth message of the first transaction of the plurality of transactions, wherein the fourth message includes the requested first type of session parameters, and wherein the transmitting of the fourth message occurs after a timeout period for providing the second type of session parameters to the first endpoint; and
   performing one of a first operation or a second operation, wherein no message having the second type of session parameters was received by the first endpoint after the transmitting of the third message and prior to the performing of the one of the first operation or the second operation,
   wherein the first operation comprises transmitting, to the second endpoint, a fifth message requesting to abort the second transaction of the plurality of transactions, and
   wherein the second operation comprises cleaning up, at the first endpoint, the second transaction of the plurality of transactions without transmitting to the second endpoint the fifth message requesting to abort the second transaction of the plurality of transactions.

4. The method of claim 3, wherein the first endpoint comprises a user equipment (UE) and the second endpoint comprises a server, wherein the first type of session parameters comprises one of a positioning measurement taken by the UE and an estimate of a position of the UE, and wherein the second type of session parameters comprises positioning assistance data.

5. The method of claim 1 wherein the initial transaction of the second session is a first transaction, and wherein the plurality of additional messages includes a second message, the method further comprising:
   transmitting, to the second endpoint, the second message, wherein the second message is of a second transaction of the second session,
   wherein the second message includes a request to abort the second transaction, and
   wherein the second message does not include a request for an acknowledgment message from the second endpoint.

6. The method of-claim 5, wherein the first endpoint comprises a user equipment (UE) and the second endpoint comprises a server, and wherein the second transaction comprises a request for positioning assistance data (AD) sent by the UE to the server, or comprises a request for positioning measurements sent from the server to the UE, or comprises a request for a position estimate sent from the server to the UE.

7. The method of claim 5 further comprising:
   after the transmitting of the second message, cleaning up, at the first endpoint, the second transaction.

8. The method of claim 5 wherein the first message is a LTE Positioning Protocol (LPP) message communicated in accordance with LPP and the second transaction is a LPP transaction conducted in accordance with LPP.

9. A mobile device for communicating with a server, the mobile device comprising:
   a transceiver for wirelessly transmitting messages to and wirelessly receiving messages from a communication network; and
   one or more processors in communication with the transceiver, wherein the one or more processors are configured to:
   obtain from the server a first message of an initial transaction of a second session to initiate the second session while a first session has not completed,
   wherein the first session commenced prior to the obtaining of the first message; and
   initiate an exchange with the server of a plurality of additional messages of the second session without initiating a transmission to the server of an abort message during a time period between the obtaining of the first message of the initial transaction of the second session and a commencement of the exchanging of the plurality of additional messages of the second session, wherein the abort message requests to abort one or more transactions of the first session, and
   wherein the mobile device and the server are each capable of operating in compliance with one or more 3rd Generation Partnership Project (3GPP) Long Term Evolution (LTE) standards.

10. The mobile device of claim 9, wherein the one or more processors are further configured to:
    during the time period between the obtaining of the first message of the initial transaction of the second session and the commencement of the exchanging of the plurality of additional messages, clean up, at the mobile device, the first session.

11. The mobile device of claim 9, wherein the second session includes a plurality of transactions, wherein the plurality of transactions includes the initial transaction of the second session, and wherein the one or more processors are further configured to:
obtain, from the server, a second message of a first transaction of the plurality of transactions, wherein the second message requests the mobile device to provide a first type of session parameters to the server;
initiate transmission, to the server, of a third message of a second transaction of the plurality of transactions, wherein the third message requests the server to provide a second type of session parameters to the mobile device different than the first type of session parameters;
in response to the second message from the server, initiate transmission, to the server, of a fourth message of the first transaction of the plurality of transactions, wherein the fourth message includes the requested first type of session parameters, and wherein the initiating of the transmission of the fourth message occurs after a timeout period for providing the second type of session parameters to the mobile device; and
perform one of a first operation or a second operation, wherein no message having the second type of session parameters was obtained by the mobile device after the initiating of the transmission of the third message and prior to the performing of the one of the first operation or the second operation,
wherein the first operation comprises initiating transmission, to the server, of a fifth message requesting to abort the second transaction of the plurality of transactions, and
wherein the second operation comprises cleaning up, at the mobile device, the second transaction of the plurality of transactions without initiating transmission to the server of the fifth message requesting to abort the second transaction of the plurality of transactions.

12. The mobile device of claim 11, wherein the first type of session parameters comprises one of a positioning measurement taken by the mobile device and an estimate of a position of the mobile device, and wherein the second type of session parameters comprises positioning assistance data.

13. The mobile device of claim 9 wherein the initial transaction of the second session is a first transaction, wherein the plurality of additional messages includes a second message, and wherein the one or more processors are further configured to:
initiate transmission, to the server, of the second message, wherein the second message is of a second transaction of the second session,
wherein the second message includes a request to abort the second transaction, and
wherein the second message does not include a request for an acknowledgment message from the server.

14. The mobile device of-claim 13, wherein the second transaction comprises a request for positioning assistance data (AD) sent by the mobile device to the server, or comprises a request for positioning measurements sent from the server to the mobile device, or comprises a request for a position estimate sent from the server to the mobile device.

15. The mobile device of claim 13, wherein the one or more processors are further configured to:
after the initiating of the transmission of the second message, clean up, at the mobile device, the second transaction.

16. A non-transitory storage medium for use with a mobile device configured to communicate with a server, wherein the non-transitory storage medium comprises machine-readable instructions stored thereon which are executable by the mobile device to:
obtain, from the server, a first message of an initial transaction of a second session to initiate the second session while a first session has not completed,
wherein the first session commenced prior to the obtaining of the first message; and
initiate an exchange, with the server, of a plurality of additional messages of the second session without initiating a transmission to the server of an abort message during a time period between the obtaining of the first message of the initial transaction of the second session and a commencement of the exchanging of the plurality of additional messages of the second session, wherein the abort message comprises a request to abort one or more transactions of the first session, and
wherein the mobile device and the server are each capable of operating in compliance with one or more 3rd Generation Partnership Project (3GPP) Long Term Evolution (LTE) standards.

17. The non-transitory storage medium of claim 16, wherein the machine-readable instructions are further executable by the mobile device to:
during the time period between the obtaining of the first message of the initial transaction of the second session and the commencement of the exchanging of the plurality of additional messages, clean up, at the mobile device, the first session.

18. The non-transitory storage medium of claim 16, wherein the second session includes a plurality of transactions, wherein the plurality of transactions includes the initial transaction of the second session, and wherein the machine-readable instructions are further executable by the mobile device to:
obtain, from the server, a second message of a first transaction of the plurality of transactions, wherein the second message requests the mobile device to provide a first type of session parameters to the server;
initiate transmission, to the server, of a third message of a second transaction of the plurality of transactions, wherein the third message requests the server to provide a second type of session parameters to the mobile device different than the first type of session parameters;
in response to receiving the second message from the server, initiate transmission, to the server, of a fourth message of the first transaction of the plurality of transactions, wherein the fourth message includes the requested first type of session parameters, and wherein the initiating of the transmission of the fourth message occurs after a timeout period for providing the second type of session parameters to the mobile device; and
perform one of a first operation or a second operation, wherein no message having the second type of session parameters was obtained by the mobile device after the initiating of the transmission of the third message and prior to the performing of the one of the first operation or the second operation,
wherein the first operation comprises initiating transmission, to the server, of a fifth message requesting to abort the second transaction of the plurality of transactions, and
wherein the second operation comprises cleaning up, at the mobile device, the second transaction of the plurality of transactions without initiating transmission to the server of the fifth message requesting to abort the second transaction of the plurality of transactions.

19. The non-transitory storage medium of claim 18, wherein the first type of session parameters comprises one of a positioning measurement taken by the mobile device and an estimate of a position of the mobile device, and wherein the second type of session parameters comprises positioning assistance data.

20. The non-transitory storage medium of claim 16, wherein the initial transaction of the second session is a first transaction, wherein the plurality of additional messages includes a second message, and wherein the machine-readable instructions are further executable by the mobile device to:
   initiate transmission, to the server, of the second message, wherein the second message is of a second transaction of the second session,
   wherein the second message includes a request to abort the second transaction, and
   wherein the second message does not include a request for an acknowledgment message from the server.

21. The non-transitory storage medium of claim 20, wherein the second transaction comprises a request for positioning assistance data (AD) sent by the mobile device to the server, or comprises a request for positioning measurements sent from the server to the mobile device, or comprises a request for a position estimate sent from the server to the mobile device.

22. The non-transitory storage medium of claim 20, wherein the machine-readable instructions are further executable by the mobile device to:
   after the initiating of the transmitting of the second message, clean up, at the mobile device, the second transaction.

23. A mobile device for communicating with a server, the mobile device comprising:
   means for receiving, from the server, a first message of an initial transaction of a second session to initiate the second session while a first session has not completed, wherein the first session commenced prior to the receipt of the first message; and
   means for exchanging, with the server, a plurality of additional messages of the second session without transmitting to the server an abort message requesting to abort one or more transactions of the first session,
   wherein the abort message is not transmitted during a time period between the receipt of the first message of the initial transaction of the second session and a commencement of the exchanging of the plurality of additional messages of the second session, and
   wherein the mobile device and the server are each capable of operating in compliance with one or more 3rd Generation Partnership Project (3GPP) Long Term Evolution (LTE) standards.

24. The mobile device of claim 23, further comprising:
   means for cleaning up, at the mobile device, the first session during the time period between the receipt of the first message of the initial transaction of the second session and the commencement of the exchanging of the plurality of additional messages.

25. The mobile device of claim 23, wherein the second session includes a plurality of transactions, and wherein the plurality of transactions includes the initial transaction of the second session, the mobile device further comprising:
   means for receiving, from the server, a second message of a first transaction of the plurality of transactions, wherein the second message requests the mobile device to provide a first type of session parameters to the server;
   means for transmitting, to the server, a third message of a second transaction of the plurality of transactions, wherein the third message requests the server to provide a second type of session parameters to the mobile device different than the first type of session parameters;
   means for transmitting, to the server, a fourth message in response receiving the second message from the server, wherein the fourth message is of the first transaction of the plurality of transactions, wherein the fourth message includes the requested first type of session parameters, and wherein the transmitting of the fourth message occurs after a timeout period for providing the second type of session parameters to the mobile device; and
   means for performing one of a first operation or a second operation, wherein no message having the second type of session parameters was received by the mobile device after the transmitting of the third message and prior to the performing of the one of the first operation or the second operation,
   wherein the first operation comprises transmitting, to the server, a fifth message requesting to abort the second transaction of the plurality of transactions, and
   wherein the second operation comprises cleaning up, at the mobile device, the second transaction of the plurality of transactions without transmitting to the server the fifth message requesting to abort the second transaction of the plurality of transactions.

26. The mobile device of claim 25, wherein the first type of session parameters comprises one of a positioning measurement taken by the mobile device and an estimate of a position of the mobile device, and wherein the second type of session parameters comprises positioning assistance data.

27. The mobile device of claim 23 wherein the initial transaction of the second session is a first transaction, wherein the plurality of additional messages includes a second message, the mobile device further comprising:
   means for transmitting, to the server, the second message, wherein the second message is of a second transaction of the second session,
   wherein the second message includes a request to abort the second transaction, and
   wherein the second message does not include a request for an acknowledgment message from the server.

28. The mobile device of claim 27, further comprising:
   means for cleaning up, at the mobile device, the second transaction after the transmitting of the second message.

* * * * *